(12) United States Patent
Ryan

(10) Patent No.: US 11,097,205 B2
(45) Date of Patent: Aug. 24, 2021

(54) REMOVAL OF HYDROPHOBIC PARTICLES USING CARBON DIOXIDE

(71) Applicant: CiDRA Corporate Services LLC, Wallingford, CT (US)

(72) Inventor: Michael Stephen Ryan, Newtown, CT (US)

(73) Assignee: CIDRA CORPORATE SERVICES LLC, Wallingford, CT (US)

( * ) Notice: Subject to any disclaimer, the term of this patent is extended or adjusted under 35 U.S.C. 154(b) by 0 days.

(21) Appl. No.: 16/498,093

(22) PCT Filed: Mar. 27, 2018

(86) PCT No.: PCT/US2018/024443
§ 371 (c)(1),
(2) Date: Sep. 26, 2019

(87) PCT Pub. No.: WO2018/183244
PCT Pub. Date: Oct. 4, 2018

(65) Prior Publication Data
US 2021/0101091 A1 Apr. 8, 2021

Related U.S. Application Data

(60) Provisional application No. 62/477,126, filed on Mar. 27, 2017.

(51) Int. Cl.
*B01D 15/00* (2006.01)
*B01D 11/02* (2006.01)
(Continued)

(52) U.S. Cl.
CPC .......... *B01D 15/00* (2013.01); *B01D 11/0203* (2013.01); *B01D 11/0223* (2013.01);
(Continued)

(58) Field of Classification Search
CPC B01D 15/00; B01D 11/0292; B01D 11/0284; B01D 11/0403;
(Continued)

(56) References Cited

U.S. PATENT DOCUMENTS 3,238,127 A * 3/1966 Sebba ................ B03D 1/01
210/704
5,256,298 A * 10/1993 Powell ............... B01J 19/22
210/660
(Continued)

FOREIGN PATENT DOCUMENTS

WO 2013074150 5/2013
WO 2013177267 11/2013
(Continued)

*Primary Examiner* — Joseph W Drodge
(74) *Attorney, Agent, or Firm* — Ware, Fressola, Maguire & Barber LLP

(57) ABSTRACT

A plurality of collection surfaces for use in an aqueous slurry has a polymeric coating to provide a compliant and sticky surface. The polymer coating has a chemical to render the surface hydrophobic so as to attract hydrophobic or hydrophobized mineral particles in the slurry. The substrate can take the form of a conveyor belt, a bead, a mesh, an impeller, a filter or a flat surface. The substrate can also be an open-cell foam. The collection surfaces having the mineral particles attached thereon are caused to interact with liquid and supercritical carbon dioxide so that the mineral particles can be stripped from the collection surfaces.

17 Claims, 15 Drawing Sheets

(51) Int. Cl.
*B01D 11/04* (2006.01)
*C02F 1/00* (2006.01)

(52) U.S. Cl.
CPC ...... *B01D 11/0284* (2013.01); *B01D 11/0292* (2013.01); *B01D 11/0403* (2013.01); *C02F 1/001* (2013.01); *B01D 2201/08* (2013.01); *B01D 2239/0471* (2013.01); *B01D 2252/202* (2013.01); *C02F 2201/002* (2013.01)

(58) Field of Classification Search
CPC ...... B01D 2239/0471; B01D 2252/202; B01D 2201/08; B01D 11/02; B01D 11/0203; B01D 11/028; B01D 11/0288; B01D 11/04; B01D 11/0411; B01D 12/00; B01D 15/36; B01D 36/00; B01D 39/1669; B01D 39/1676; B01D 39/20; B01D 39/2051; B01D 39/2055; B01D 39/2068; B01D 39/2093; B01D 61/00; B01D 71/30; B01D 2201/06; B01D 2201/087; B01D 2239/0428; B01D 2275/302; B01D 2325/38; B01D 11/0215; B01D 11/0219; B01D 11/0223; B01D 11/0226; B01D 11/023; C02F 1/001; C02F 2201/002; C02F 1/24; C02F 1/26; C02F 1/28; C02F 1/281; C02F 1/285; C02F 1/288; C02F 2209/105; C02F 2305/14; B03D 1/002; B03D 1/016; B03D 1/018; B03D 1/02; B03D 1/026; B03D 1/12; B03D 1/1456; B03B 5/30; B03B 5/44; B03B 7/00; B03B 13/005; B01J 20/02; B01J 20/0203; B01J 20/06; B01J 20/08; B01J 20/10; B01J 20/20; B01J 20/22; B01J 20/28; B01J 20/28016; B01J 20/28026; B01J 20/28042; B01J 20/28045

See application file for complete search history.

(56) References Cited

U.S. PATENT DOCUMENTS

| | | | |
|---|---|---|---|
| 6,210,648 B1* | 4/2001 | Gathje | B03D 1/02 |
| | | | 423/26 |
| 10,683,362 B2 | 6/2020 | Pastan et al. | |
| 2010/0300941 A1* | 12/2010 | Domke | B03C 1/015 |
| | | | 209/8 |
| 2011/0120919 A1* | 5/2011 | Domke | B03C 1/015 |
| | | | 209/7 |
| 2011/0277380 A1 | 11/2011 | Wibberly | |
| 2012/0029120 A1* | 2/2012 | Soane | C02F 1/5272 |
| | | | 524/7 |
| 2012/0282864 A1 | 11/2012 | Dimou et al. | |
| 2013/0111808 A1 | 5/2013 | Yoon et al. | |
| 2013/0200182 A1* | 8/2013 | Eduardo De Rezende | |
| | | | B02C 23/08 |
| | | | 241/24.1 |
| 2013/0340328 A1 | 12/2013 | Yoon | |
| 2014/0138324 A1* | 5/2014 | Rothman | B03C 5/00 |
| | | | 210/748.02 |
| 2014/0339172 A1* | 11/2014 | Rothman | B01J 20/3293 |
| | | | 210/679 |
| 2015/0041368 A1* | 2/2015 | Kersey | B03D 1/1456 |
| | | | 208/390 |
| 2015/0083646 A1* | 3/2015 | Didden | B03B 5/28 |
| | | | 209/10 |
| 2015/0151308 A1* | 6/2015 | Davis | B03D 1/018 |
| | | | 209/12.2 |
| 2016/0067631 A1* | 3/2016 | Rothman | B01D 15/206 |
| | | | 210/241 |
| 2016/0123852 A1 | 5/2016 | Pugia et al. | |
| 2017/0120258 A1* | 5/2017 | Silva | C01G 49/02 |
| 2017/0232451 A1 | 8/2017 | Rothman et al. | |
| 2018/0093899 A1* | 4/2018 | Poffet | B01J 20/24 |

FOREIGN PATENT DOCUMENTS

| | | |
|---|---|---|
| WO | 2015184436 | 12/2015 |
| WO | 2018085364 A1 | 5/2018 |
| WO | 2018085490 | 5/2018 |

* cited by examiner

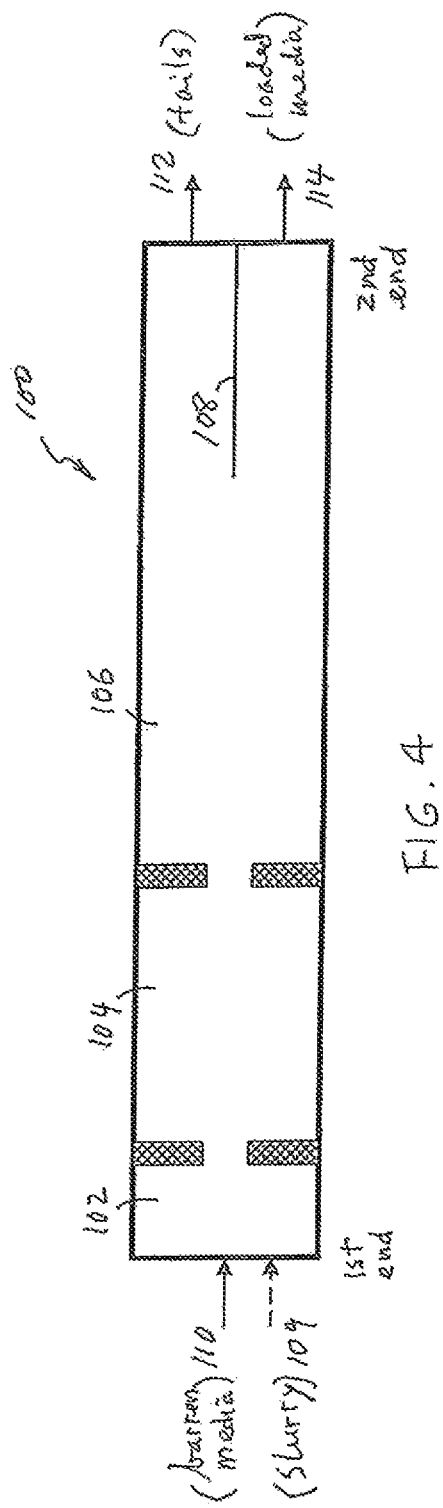

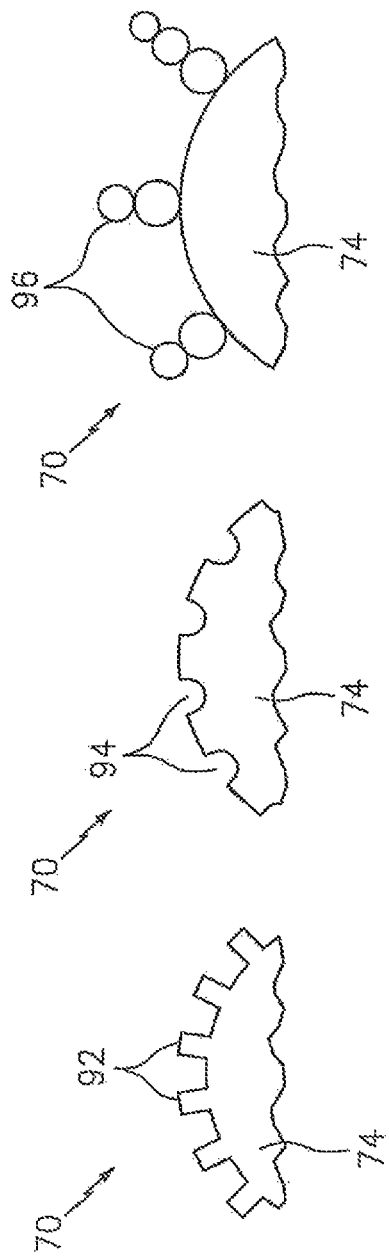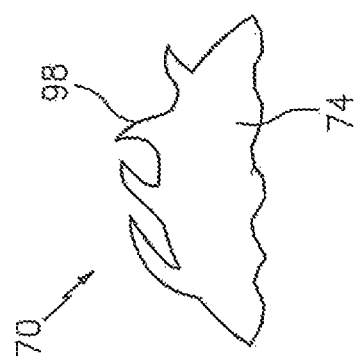

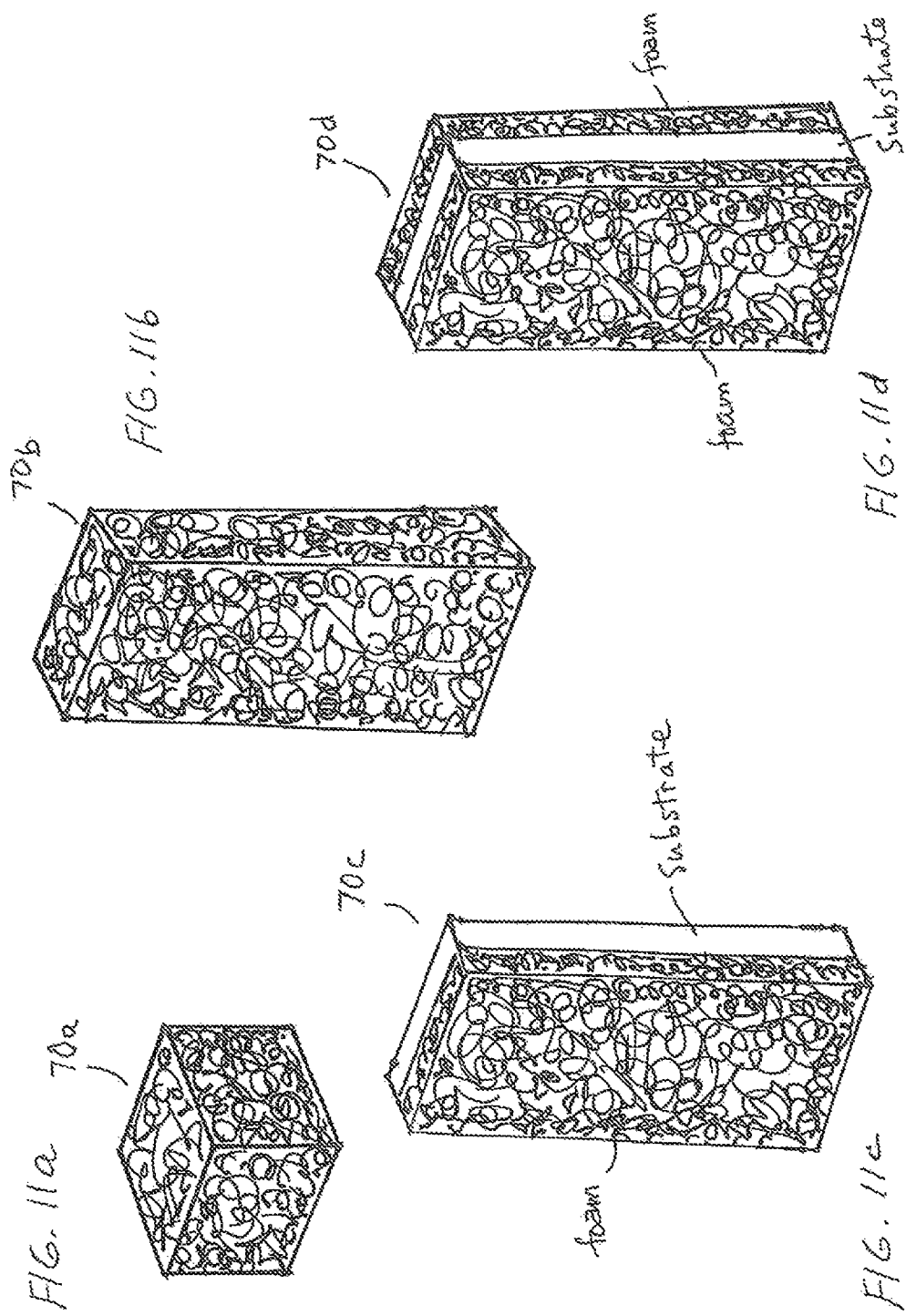

REMOVAL OF HYDROPHOBIC PARTICLES USING CARBON DIOXIDE

CROSS-REFERENCE TO RELATED PATENT APPLICATIONS

The present application claims the benefit of U.S. Provisional Patent Application No. 62/477,126, filed 27 Mar. 2017, entitled "Removal of hydrophobic particles using carbon dioxide", which is incorporated by reference herein in its entirety.

The present application is related to PCT application No. PCT/US18/20423/filed 1 Mar. 2018, entitled "Mineral processing plant", which claims the benefit of U.S. provisional application No. 62/465,231, filed 1 Mar. 2017, entitled "Conventional mineral processing plant", which are all incorporated by reference herein in their entirety.

The present application is related to PCT application No PCT/US17/12689, filed 9 Jan. 2017, entitled "Recovery media for mineral processing using open cell or reticulated foam having 3-dimensional functionalized open-network structure for selective separation of mineral particles in an aqueous system", which claim the benefit of U.S. provisional application No. 62/276,051, entitled "Novel recovery media for mineral processing", filed 7 Jan. 2016, and U.S. provisional application No. 62/405,569, entitled "Three dimensional functionalized open-network structure for selective separation of mineral particles in an aqueous system", filed 7 Oct. 2016, which are all incorporated by reference herein in their entirety.

The present application is related to PCT application No. PCT/US17/59650, filed 2 Nov. 2017, entitled "Polymer coating for the selective separation of hydrophobic particles in aqueous slurry", which claims the benefit of U.S. Provisional Patent Application No. 62/416,314, filed 2 Nov. 2016, entitled "Polymer coating for the selective separation of hydrophobic particles in aqueous slurry", which are all incorporated by reference herein in its entirety.

This application is also related to a family of eight PCT applications, which were all concurrently filed on 25 May 2012, as follows:

PCT application no. PCT/US12/39528, entitled "Flotation separation using lightweight synthetic bubbles and beads;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest," which corresponds to U.S. Pat. No. 9,352,335;

PCT application no. PCT/US12/39591, entitled "Method and system for releasing mineral from synthetic bubbles and beads;"

PCT application no. PCT/US/39596, entitled "Synthetic bubbles and beads having hydrophobic surface;"

PCT application no. PCT/US/39631, entitled "Mineral separation using functionalized filters and membranes," which corresponds to U.S. Pat. No. 9,302,270 ;"

PCT application no. PCT/US12/39655, entitled "Mineral recovery in tailings using functionalized polymers;" and PCT application no. PCT/US12/39658, entitled "Techniques for transporting synthetic beads or bubbles in a flotation cell or column," all of which are incorporated by reference in their entirety.

This application also related to PCT application no. PCT/US2013/042202, filed 22 May 2013, entitled "Charged engineered polymer beads/bubbles functionalized with molecules for attracting and attaching to mineral particles of interest for flotation separation," which claims the benefit of U.S. Provisional Patent Application No. 61/650,210, filed 22 May 2012, which is incorporated by reference herein in its entirety.

This application is also related to PCT/US2014/037823, filed 13 May 2014, entitled "Polymer surfaces having a siloxane functional group," which claims benefit to U.S. Provisional Patent Application No. 61/822,679, filed 13 May 2013, which is incorporated by reference herein in its entirety.

This application also related to PCT application no. PCT/US13/28303, filed 28 Feb. 2013, entitled "Method and system for flotation separation in a magnetically controllable and steerable foam," which is also hereby incorporated by reference in its entirety.

This application also related to PCT application no. PCT/US16/57334, filed 17 Oct. 2016, entitled "Opportunities for recovery augmentation process as applied to molybdenum production," which is also hereby incorporated by reference in its entirety.

This application also related to PCT application no. PCT/US16/37322, filed 17 Oct. 2016, entitled "Mineral beneficiation utilizing engineered materials for mineral separation and coarse particle recovery," which is also hereby incorporated by reference in its entirety.

BACKGROUND OF THE INVENTION

1. Technical Field

This invention relates generally to a method and apparatus for separating valuable material from unwanted material in an aqueous mixture, such as a pulp slurry.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic, as well as to aid the formation of bubbles and the stability of the froth, and the air is used to carry the material to the surface of the flotation cell. When the hydrophobic material and the air bubbles collide, they become attached to each other. The bubble rises to the surface carrying the desired material with it. Controlling the bubble surface area flux has traditionally been very difficult. This is a multivariable control problem and there are no dependable real time feedback mechanisms to use for control.

There is a need in the industry to provide a better way to separate valuable material from unwanted material, e.g., including in such a flotation cell, so as to eliminate problems associated with using air bubbles in such a separation process.

SUMMARY OF THE INVENTION

The present invention provides an apparatus and method for removal of mineral particles from enriched engineered media using liquid and/or supercritical carbon dioxide or other low surface-tension liquids to lower the energy of the aqueous system containing hydrophobic mineral particles. Liquid and/or supercritical carbon dioxide is herein referred to as Liquid $CO_2$ and is used as an example of the low surface-tension liquids for mineral particle removal. The engineered media, according to various embodiments of the present invention, are solid-phase collection surfaces having a hydrophobic, polymeric coating to attract mineral particles in a slurry. Each of the collection surfaces can be a sheet, a sphere, a cube, a filter, a conveyer belt, made of glass, ceramic, metal, soft plastic or hard plastic. The surface can have various surface structures. In particular, the collection surface is made of a reticulated foam having 3-dimensional open-cell structures. The polymeric coating can be used to provide a compliant and tacky surface with low surface energy.

The engineered media, according to various embodiments of the present invention, are effective in attracting mineral particles to become enriched engineered media. Subsequently, the mineral particles on the enriched media are stripped off and collected. The mineral particles can be stripped off in water or in a surfactant with various releasing forces. In the present invention, the mineral particles are stripped off the enrich media using liquid $CO_2$ as a release agent. Using liquid $CO_2$, essentially no release agent carry-over would occur; thereby protecting the overall system from release agent contamination and providing near 100% recirculation of release agent; thereby saving cost and providing environmental benefits. The release agents described, include materials that are effective at particle removal due to low surface tension while also having the ability to be evaporated from the substrate, re-condensed, and then re-used for subsequent release processing.

Thus, the first aspect of the present invention provides an apparatus, comprising:

loaded media comprising one or more collection surfaces having mineral particles attached thereon;

a releasing agent; and a mixing compartment configured to facilitate contacting between said one or more collection surfaces and the releasing agent so as to separate the mineral particles from said one or more collection surfaces, wherein the releasing agent is selected from the group consisting of liquid carbon dioxide, supercritical fluid carbon dioxide, HFC, alcohols and liquid alkanes.

According to an embodiment of the present invention, each of said one or more collection surfaces comprises a solid-phase body having a surface functionalized to be hydrophobic.

According to an embodiment of the present invention, the solid-phase body is made of a synthetic material.

According to an embodiment of the present invention, the solid-phase body comprises a three-dimensional open cellular structure.

According to an embodiment of the present invention, the solid-phase body comprises an open-cell foam coated with a compliant, tacky polymer of low surface energy.

According to an embodiment of the present invention, the solid-phase body comprises an open-cell foam made from a material selected from the group consisting of reticulated polyurethane, silicone, polychloroprene, polyisocyanurate, polystyrene, polyolefin, polyvinylchloride, epoxy, latex, fluoropolymer, phenolic, EPDM and nitrile. According to an embodiment of the present invention, the surface comprises a coating made of polysiloxane derivative.

According to an embodiment of the present invention, the surface is modified with tackifiers, plasticizers, crosslinking agents, chain transfer agents, chain extenders, adhesion promoters, aryl or alky copolymers, fluorinated copolymers, hydrophobizing agents such as hexamethyldisilazane, and/or inorganic particles such as silica or hydrophobic silica.

According to an embodiment of the present invention, the surface comprises a coating made of a material selected from the group consisting of pressure sensitive adhesives, e.g. acrylics, butyl rubber, ethylene vinyl acetate, natural rubber, nitriles; styrene block copolymers with ethylene, propylene, and isoprene; polyurethanes, and polyvinyl ethers.

According to an embodiment of the present invention, the solid-phase body comprises an open-cell structure made of a material selected from the group consisting of hard plastics, ceramics, carbon fiber, and metals.

According to an embodiment of the present invention, the solid-phase body may take the form of a sheet, a sphere, a cube, a block, a filter or a conveyor belt.

According to an embodiment of the present invention, the three-dimensional open cellular structure comprises a cellular density ranges from 10 to 200 pores per inch.

According to an embodiment of the present invention, the loaded media are stripped off of the mineral particles to become barren media, and the mixing compartment comprises a first end a second end, the first end comprising a first mixer input configured to receive the release agent and a second mixer input configured to receive the loaded media, the second end comprising a first mixer output configured to discharge the barren media and a second mixer output configured to discharge a mixture containing mineral particles and the releasing agent, the apparatus further comprising a loading stage and a filtering stage, wherein the loading stage comprises a first input configured to receive a slurry having the mineral particles, a second input configured to receive the barren media, a first output configured to discharge a remaining part of the slurry and a second output to provide the loaded media to the mixing compartment, and the filtering stage is configured to receive the mixture containing the mineral particles and the releasing agent and to separate the mineral particles and the releasing agent in the mixture, wherein the filtering stage comprises a first stage output and a second stage output, the first stage output configured to return the separated releasing agent to the mixing stage, the second stage output configured to discharge the separated mineral particles as concentrates.

According to an embodiment of the present invention, the barren media discharged from the first mixer output and the concentrates discharged from the second stage output comprise a residual amount of the releasing agent, the apparatus further comprising a first phase-change device and a second phase-changer device, the first phase-changer device configured to change the residual amount of the releasing agent into a gaseous agent, the second phase-changer device configured to change the gaseous agent into a recovered releasing agent.

According to an embodiment of the present invention, the recovered releasing agent is recycled back to the mixing compartment.

The second aspect of the present invention provides a method for use in collecting mineral particles in a slurry, the method comprising receiving loaded media comprising one or more collection surfaces having the mineral particles attached thereon;

causing the loaded media to interact with a releasing agent so as to separate the mineral particles from said one or more collection surfaces, wherein the releasing agent is selected from the group consisting of liquid carbon dioxide, supercritical fluid carbon dioxide, HFC, alcohols and liquid alkanes.

According to an embodiment of the present invention, each of said one or more collection surfaces comprises a solid-phase body having a surface functionalized to be hydrophobic.

According to an embodiment of the present invention, the solid-phase body comprises an open-cell foam coated with a compliant, tacky polymer of low surface energy.

According to an embodiment of the present invention, the solid-phase body comprises an open-cell foam made from a material selected from the group consisting of reticulated polyurethane, silicone, polychloroprene, polyisocyanurate, polystyrene, polyolefin, polyvinylchloride, epoxy, latex, fluoropolymer, phenolic, EPDM and nitrile.

According to an embodiment of the present invention, the surface is modified with tackifiers, plasticizers, crosslinking agents, chain transfer agents, chain extenders, adhesion promoters, aryl or alky copolymers, fluorinated copolymers, hydrophobizing agents such as hexamethyldisilazane, and/or inorganic particles such as silica or hydrophobic silica.

BRIEF DESCRIPTION OF THE DRAWING

FIG. 4 illustrates a generalized processing module, according to a related invention.

FIG. 10a illustrates the surface of a synthetic bead with grooves and/or rods, according to some embodiments of the present invention.

FIG. 10b illustrates the surface of a synthetic bead with dents and/or holes, according to some embodiments of the present invention.

FIG. 10c illustrates the surface of a synthetic bead with stacked beads, according to some embodiments of the present invention.

FIG. 10d illustrates the surface of a synthetic bead with hair-like physical structures, according to some embodiments of the present invention.

FIG. 11a illustrates a collection media taking the form of an open-cell foam in a cubic shape.

FIG. 11b illustrates a filter according to some embodiments of the present invention.

FIG. 11c illustrates a section of a membrane or conveyor belt according to an embodiment of the present invention.

FIG. 11d illustrates a section of a membrane or conveyor belt according to another embodiment of the present invention.

DETAILED DESCRIPTION OF THE INVENTION

Figure 1:
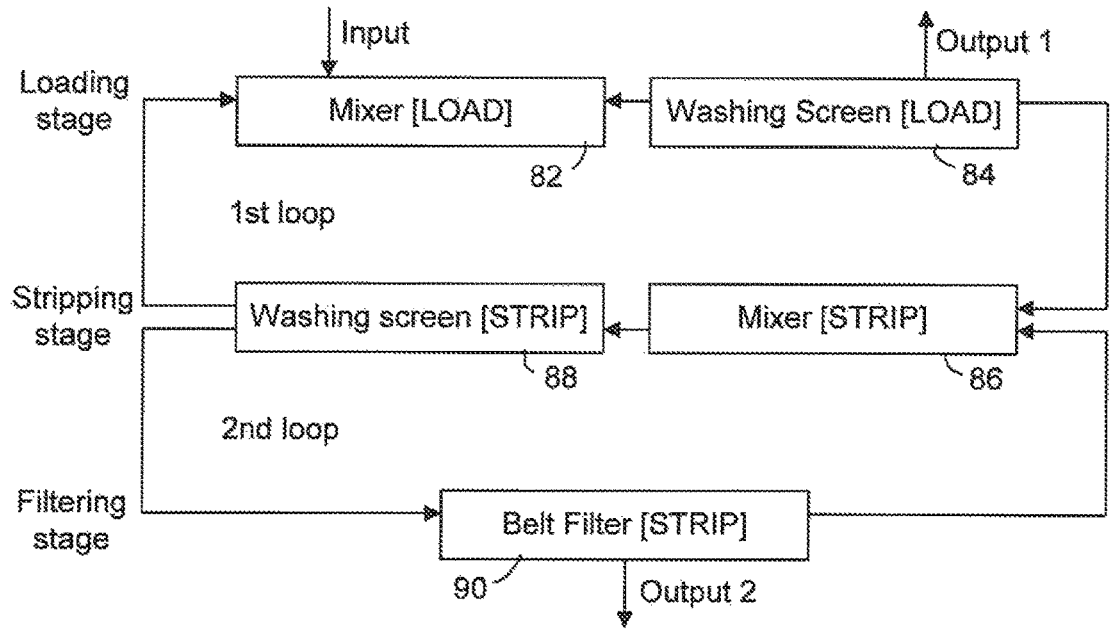
FIG. 1 illustrates a selective recirculation circuit, according to a related invention.

The present invention provides an apparatus for use in an aqueous slurry containing minerals and unwanted materials. The minerals include hydrophobic or hydrophobized mineral particles. The apparatus comprises a substrate arranged to contact with the aqueous slurry and a polymeric coating disposed on the substrate. The polymeric coating has a compliant and tacky surface with a chemical to render the surface hydrophobic so as to attract the hydrophobic or hydrophobized mineral particles.

According to an embodiment of the present invention, the polymeric coating provides a compliant, tacky surface of low energy to enhance selective collection of hydrophobic and hydrophobized particles ranging widely in particle size when distributed in an aqueous slurry. For example, the polymeric coating may be mounted on a substrate, such as a flat surface, belt, bead, mesh, filter, open cell foam structure, or other substrates.

By way of example, beads and foam in various shapes are disclosed in commonly owned, PCT application No. PCT/US17/12689, filed 9 Jan. 2017, entitled "Recovery media for mineral processing using open-cell or reticulated foam having 3-Dimensional functionalized open-network structure for selective separation of mineral particles in an aqueous system", which is hereby incorporated by reference in its entirety.

By way of further example, open cell foam structures are disclosed in commonly owned, U.S. Provisional Application Nos. 62/276,051, filed Jan. 7, 2016 and 62/405,569, filed Oct. 5, 2016, which are all also hereby incorporated by reference in their entirety.

By way of still further example, PDMS coating and other media coating materials are disclosed in commonly owned, PCT application no. PCT/US2015/33485, filed Jun. 1, 2015, U.S. Pat. Nos. 9,352,335 and 9,731,221, which are all hereby incorporated by reference in their entirety.

As disclosed in the above references, the substrate coated with the polymeric coating may be disposed within the aqueous slurry for interaction with, and selective collection of, hydrophobic and hydrophobized particles. The aqueous slurry contains the hydrophobic and/or hydrophobized particles and may also contain unwanted particles that are less hydrophobic or are hydrophilic. For example, in the mining industry, aqueous mining slurries contain a mixture of minerals and other materials. The other materials in the slurry are typically referred to as "gangue materials," and include various natural elements found in a mining deposit, such as sands, clays and other materials. Typically, the minerals and gangue material are ground to an average particle size. For example, depending on the mineral type, the average particle size of the mixture of minerals and gangue materials may range from fines of only several microns to coarse particles of greater than 800 microns. The ground minerals and gangue may be mixed with water to create the aqueous slurry. The minerals may be sulfide-based minerals, such as copper, gold, lead, zinc, nickel, iron or other minerals. However, other minerals may be collected with the system of the present invention. Additionally, the minerals may be further hydrophobized by the addition of collector chemicals to the aqueous slurry, such as xanthate, dithiophosphate, dithiophosphinate, dithiocarbamate, thionocarbamate, hydroxamates, amine ethers, primary amines, fatty acids and their salts, and petroleum-based collector chemistries commonly known in the mining industry. Additionally, depressants may be added to the aqueous slurry to reduce the hydrophobicity of the gangue materials or other materials that are not desired to be collected by the polymeric coating. Examples of common depressants include cyanide, zinc sulfate, sulfur dioxide, sodium hydrosulfide, sodium sulfide, Nokes reagent, phosphates, diethylenetriamine, triethylenetetramine, certain amphiphilic polymers often based on polyacrylamide, and natural products such as starch, dextrin, CMC, tannin, quebracho, and lignosulfonates.

The polymer of the polymeric coating may be comprised of a polysiloxane derivative, such as, but not limited to, polydimethylsiloxane. The polymer may be modified with: tackifiers; plasticizers; crosslinking agents; chain transfer agents; chain extenders; adhesion promoters; aryl or alky copolymers; fluorinated copolymers and/or additives; hydrophobizing agents such as hexamethyldisilazane; inorganic particles such as silica, hydrophobic silica, and/or fumed hydrophobic silica; MQ resin; and/or other additives to control and modify the properties of the polymer.

In another embodiment of the present invention, the coating may be comprised of other materials typically known as pressure sensitive adhesives, including, but not limited to: acrylics; butyl rubber; ethylene vinyl acetate; natural rubber; nitriles; styrene block copolymers with ethylene, propylene, and/or isoprene; polyurethanes; and polyvinyl ethers so long as they are formulated to be compliant and tacky with low surface energy.

The materials listed above are formulated to be compliant and tacky with low surface energy. All of these polymers may be mono-, bi-, or multi-modal, and such materials may be modified with alkyl, aryl, and/or fluorinated functionalities; silica-based additives and other inorganics such as clays and/or bentonite; low molecular weight and oligomeric plasticizers; degrees of crosslinking density and branchedness (polymer structure); and/or POSS materials.

The modification in each case is to lower the surface energy and/or optimize compliance and tack. Very effective coatings can be prepared from various modified silicones, acrylics, and ethylene vinyl acetate; however, all of the aforementioned polymers are effective if properly prepared to include the desired qualities of lower surface energy, compliance and tack. The coating of the present invention has a hydrophobic surface with a contact angle $\theta_C$ greater than 90°. To maximize selective collection of desired hydrophobic or hydrophobized particles distributed in an aqueous slurry, the contact angle $\theta_C$ of a drop of water on the surface of the coating should be greater than 90° signifying a hydrophobic surface. More preferably, the contact angle $\theta_C$ is between 100° and 140°. Very effective coatings have been prepared with contact angles greater than 120°.

The compliance of the coating is a factor in determining the collection efficiency of the hydrophobic particles on the coating as well as the distribution of particle sizes collected on the coating. A fully non-compliant hardened coating will not collect or only have very limited collection of fines (small micron size particles) whereas an extremely soft coating, while collecting a large range of particles, lacks the cohesion to durably remain on its substrate in repeated use. A moderately compliant coating allows particle adhesion while also possessing the cohesion necessary to remain on the substrate. The cohesion of the coating is directly related to the durability of the coating- the greater the cohesion of a particular coating, the greater the durability of that coating. Compliance is also affected by coating thickness; therefore, coating thickness is also an important parameter in hydrophobic particle collection efficiency. It is known that upon contact with a compliant surface, the compliance or "give" of the surface may allow greater surface to surface contact between the compliant surface and the object that comes in contact with the compliant surface. In contrast, a non-compliant, or hard, surface would not provide as much compliance, or give, when in contact with another object, providing less potential surface contact. The coating of the present invention is designed to include a compliant surface that provides increased surface area contact between the coating and a particle that comes in contact with the compliant coating; thereby enhancing adhesion forces. Coating thickness may be as low as 0.3 mils and greater than 1.0 mils, but is preferably greater than 0.75 mils (1 mils=25.4 microns). In general, coatings with low compliance preferentially collect smaller particle sizes while coatings with higher compliance collect a larger distribution of particle sizes.

Hydrophobic, compliant coatings have been prepared with minimal tack that exhibit particle collection; however, enhanced collection is generally achieved when the coating is tacky as measured by loop tack against polished stainless steel using PSTC-16 Method A. Loop tack is preferably greater than 5 grams-force, more preferably greater than 50 grams-force, and most preferably greater than 100 grams-force. Very effective coatings were prepared with loop tack of 300-600 grams-force.

The polymeric coating may be reacted with additional functionality allowing it to bond directly with a particle of interest. This functionality could include oxyhydryl, sulfhydryl, or cationic functionality found in mineral collectors.

The aforementioned coatings may be applied to any substrate effective in slurry processing. Substrates that may be coated include solid, hollow, or network structures made of glass, metal, ceramic, or polymer that may be smooth or have rough surface morphology to improve coating adhesion and/or to increase surface area. The substrate may be comprised of open-cell foam, including reticulated polyurethane or another appropriate open-cell foam material such as silicone, polychloroprene, polyisocyanurate, polystyrene, polyolefin, polyvinylchloride, epoxy, latex, fluoropolymer, phenolic, EPDM, nitrile, composite foams and such. The substrate may be comprised of other three-dimensional open cellular structures such as hard plastics, ceramics, carbon fiber, and metals may be used. Examples include Incofoam®, Duocel®, metal and ceramic foams produced by American Elements®, and porous hard plastics such as polypropylene honeycombs and such. The three-dimensional, open cellular structure may itself form a compliant, tacky surface of low energy by, for example, forming such a structure directly from the coating polymers as described above.

The three-dimensional, open cellular structures mentioned above may be coated or may be directly reacted to form a compliant, tacky surface of low energy.

The structure may be in the form of sheets, cubes, spheres, or other shapes as well as densities (described by pores per inch and pore size distribution), and levels of tortuosity that optimize surface access, surface area, mineral attachment/detachment kinetics, and durability. These structures may be additionally optimized to target certain mineral particle size ranges, with denser structures acquiring smaller particle sizes. In general, cellular densities may range from 10-200 pores per inch, more preferably 30-90 pores per inch, and most preferably 30-60 pores per inch.

In order to concentrate the mineral particles, the particles must be removed from the substrate surface and retained in pure form. The removal can be accomplished effectively using an aqueous solution or dispersion of surfactant with or without organic solvent to achieve a low surface tension release agent. As the hydrophobic surface and the particles have high surface area; they retain significant portions of release agent that are very difficult to recover. This leads to very significant losses of expensive release agent. Additionally, as the surfaces are reused, this residual release agent contaminates other processes.

According to an embodiment of the present invention, liquid CO2 is used as the release agent in place of the aqueous solution or dispersion of surfactant with or without organic solvent. Liquid CO2 is an effective cleaning agent due to its low density, allowing ease of entry to and exit from porous media, and low surface tension allowing effective wetting of the surface and efficient particle removal. Additionally, liquid CO2 has the advantage of complete recoverability from both the media and the particle concentrate. The residual liquid CO2 is allowed to return to its gas phase, eliminating it from the media and particle concentrate, and is then fully recovered through condensation and returned to the cleaning system for reuse. It is also possible to add small amounts of surfactant to the liquid carbon dioxide to enhance particle removal if necessary. This may lead to a small amount of residual surfactant left on the surfaces. However, it is minimal compared to the use of the aqueous solution.

Again, the use of surfactant systems for the removal of hydrophobic particles from hydrophobic surfaces in an aqueous system is effective. However, removal of the surfactants from the substrate can be difficult, particularly if the substrate is a three-dimensional porous network in which the surfactant system becomes entrained. The surfactant-laden substrate can be spun, squeezed or wrung fairly dry of the surfactant system, yet some of the surfactant may still be impossible to remove. Additionally, when the hydrophobic particles are collected, they will also retain some surfactant system. For example, it is well known that mineral particles retain approximately no less than 10-12% of their mass in liquid carry-over. In each of these cases, it would be beneficial to eliminate or reduce the carry-over of surfactant system which is wasteful and may contaminate other processes.

The present invention makes use of materials that are liquids in-use and then are easily evaporated off the substrates and particles and then are repeatedly re-used for further particle removal. These materials must be low surface-tension liquids in order to lower the energy of the aqueous system containing hydrophobic particles attached to hydrophobic surfaces. These materials must also evaporate readily and be compatible with the substrate such that rapid chemical or mechanical degradation doesn't occur. Materials of interest include liquid carbon dioxide, liquid HFC's and blends with HFC's, low boiling alcohols such as methanol, and liquid low-boiling alkanes as examples. Blends with HFC's may include, for example but not limited to, products such as Freon™ M099 which is a blend of pentafluoroethane; 1,1,1,2-tetrafluoroethane; difluoromethane; butane; and isopentane. To be used as a release agent, liquid carbon dioxide, HFC's (and blends), and certain low-boiling alkanes (C-4 and lower) must be pressurized to liquefy in-use. After the hydrophobic particles are removed and separated from the substrate, the pressure is lowered in order to evaporate the liquid release agent. The liquid release agent is then re-condensed by re-pressurizing and charged back to the release vessel.

In the case of low boiling alcohols such as methanol and other certain low-boiling alkanes (C-5 and somewhat higher), they are liquid at room temperature and, therefore, no pressurization is necessary during the release process. After release, the particles are separated from the substrate and then the temperature is increased to evaporate the liquid release agent which is then re-condensed via a decrease in temperature and charged back to the release vessel.

Low surface tension is useful for the removal of hydrophobic particles from hydrophobic surfaces. As compared to the surface tension of water of approximately 72.8 dynes/cm, all of the materials that are used by the present invention have low surface tension: Liquid carbon dioxide is near zero dynes/cm, pentafluoroethane is approximately 8 dynes/cm, isopentane is approximately 16 dynes/cm, and methanol is approximately 22.5 dynes/cm. Furthermore, the release agents, according to various embodiments of the present invention, are also compatible with the substrate such as not to degrade it. For example, liquid carbon dioxide and methanol are relatively compatible with polydimethylsiloxane hydrophobic substrates. The other release agents mentioned are also compatible with other hydrophobic substrates.

It should be noted that, in this disclosure, the terms "hydrophobic substrates or surfaces", "engineered media", "synthetic beads", "barren media" are used interchangeably; the engineered media having mineral particles attached thereon are also referred to as loaded media, enriched engineered media or enriched media; "hydrophobic or hydrophobicized particles" and "mineral particles" are used interchangeably. It is understood that engineered media have a hydrophobic surface or a hydrophobic polymeric coating.

As mentioned above, the term "liquid CO2" is used only as an example of the low surface-tension liquids used as release agents, according to various embodiments of the present invention. The low surface-tension liquids include liquid and supercritical carbon dioxide, liquid HFCs, low boiling alcohols, low boiling alkanes and the like.

In general, the recovery of mineral particles in a slurry involves three stages: 1) a loading stage where engineered media are caused to interact with the slurry so as to allow the mineral particles to attach to the engineered media, 2) a stripping stage where the loaded media are mixed with a release or stripping agent so as to strip the mineral particles off the loaded media, and 3) a filtering stage where mineral particles are filtered in order to get rid of the stripping agent.

FIG. 1 shows a block diagram representing various stages in a selective recirculation circuit 80, according to an embodiment of the present invention. The selective recirculation circuit 80 consists of two co-current circulating loops of media and stripping solution. The circuit 80 comprises a loading stage, a stripping stage and a filtering stage. The stripping stage is configured to form a first loop with the loading stage and a second loop with the filtering stage. The loading stage comprises a mixer 82 and a washing screen 84, and the stripping stage comprises a mixer 86 and a washing screen 88. The stripping stage is linked a filter 90 of the filtering stage. The selective recirculation 80 has an input to the mixer 82, an output 1 provided on the washing screen 84 and an output 2 provided on the filter 90.

The selective recirculation circuit 80 has many different uses. One of those uses is depicted in FIG. 3.

Figure 3:
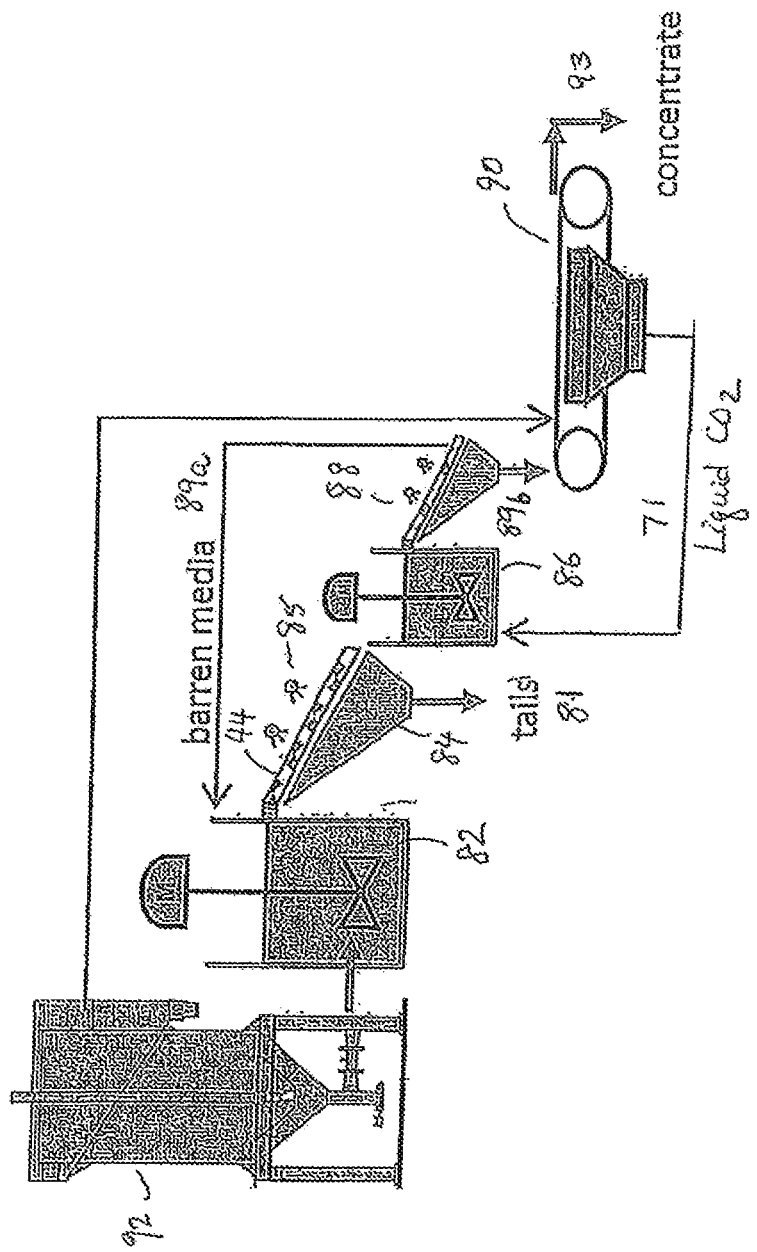
FIG. 3 illustrates an application of the selective recirculation circuit, according to an embodiment of the present invention.

FIG. 3 shows an apparatus comprising of two sets of mixer-separators, each of which is used as an agitation tank to a screen. As shown in FIG. 3, barren media 89a is contacted with a feed stream 79 (slurry and unrecovered mineral particles) from the input, where the minerals are loaded on the media in the mixer 82, and the loaded media 85 are directed to the washing screen 44, where the media is separated from the slurry on a vibrating screen equipped with wash water sprays ("washing screen"). The loaded media 85 are then directed to the stripping stage, which removes the mineral particles from the media. In the stripping stage, after the loaded media in the mixer 86 are stirred, they are directed to the washing screen 88, where the barren media 89a are recovered and returned to the loading stage (mixer 82). The stripping solution 71 is recovered in the filter 90 and returned to the stripping stage (mixer 86). The mineral particles are recovered through the filter or belt 90 as concentrate 93 in a concentrate stream. In FIG. 3, the mixer 82 receives the feed form a flotation stage (contact cell) 92.

Figure 2A:
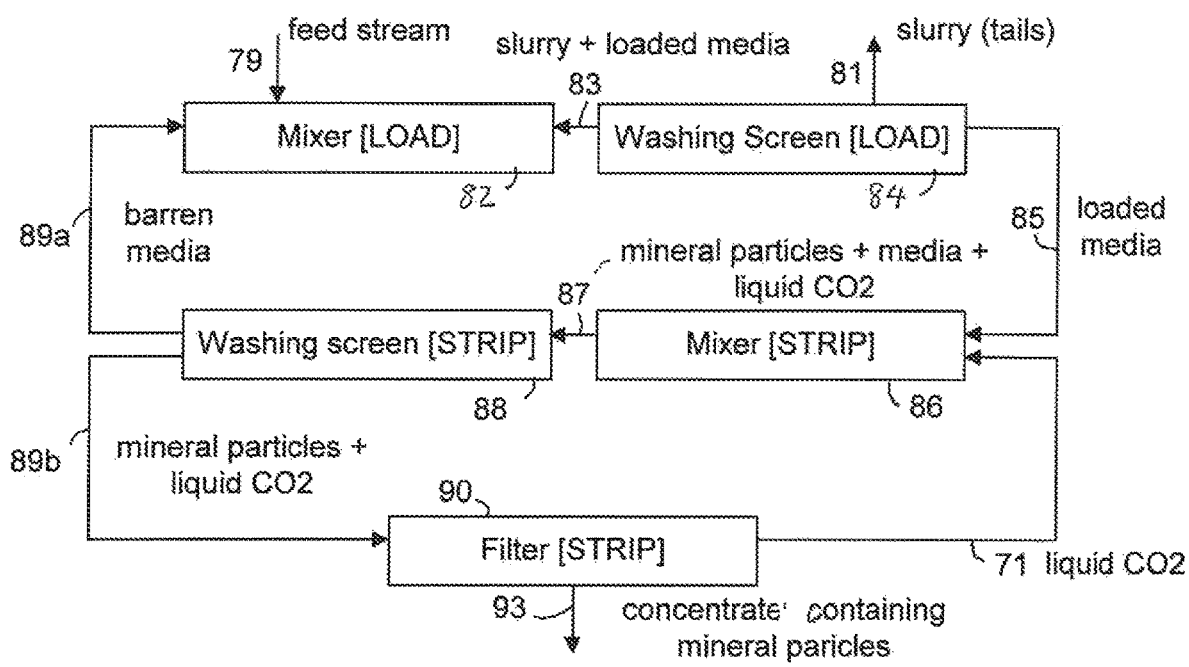
FIG. 2a illustrates an application of the selective recirculation circuit, according to an embodiment of the present invention.

In the above disclosed application, the selective recirculation circuit 80 can be depicted as a selective recirculation loop shown in FIG. 2a. As shown, the input of the selective recirculation circuit 80 is arranged to receive the tails from a flotation stage as feed 79 of slurry and mineral particles. Output 1 is used to discharge the slurry as tails 81 and the output 2 is used to output the concentrates 93. As shown in FIG. 2a, the loading mixer 82 also receives barren media 89a from the stripping stage and causes the barren media to contact with slurry so that the mineral particles in the slurry are loaded on the barren media. The mixture 83 of slurry and loaded media 85 are directed to the loading washing screen 84 where loaded media are separated from the slurry which is discharged as tails. The loaded media 85 is directed to stripping mixer 86 where mineral particles are stripped from the loaded media. The mixture 87 of mineral particles, the media and the stripping solution is directed to the stripping washing screen 88 where barren media 89a is returned to the loading stage, while the mineral particles and stripping solution in mixture 89b are separated by the filter 90. The stripping solution or release agent 71 is recycled to the stripping stage, while the mineral particles are discharged as concentrates 93. In an embodiment of the present invention, liquid and supercritical carbon dioxide (liquid CO2) is used as a release agent in the stripping stage.

Figure 2B:
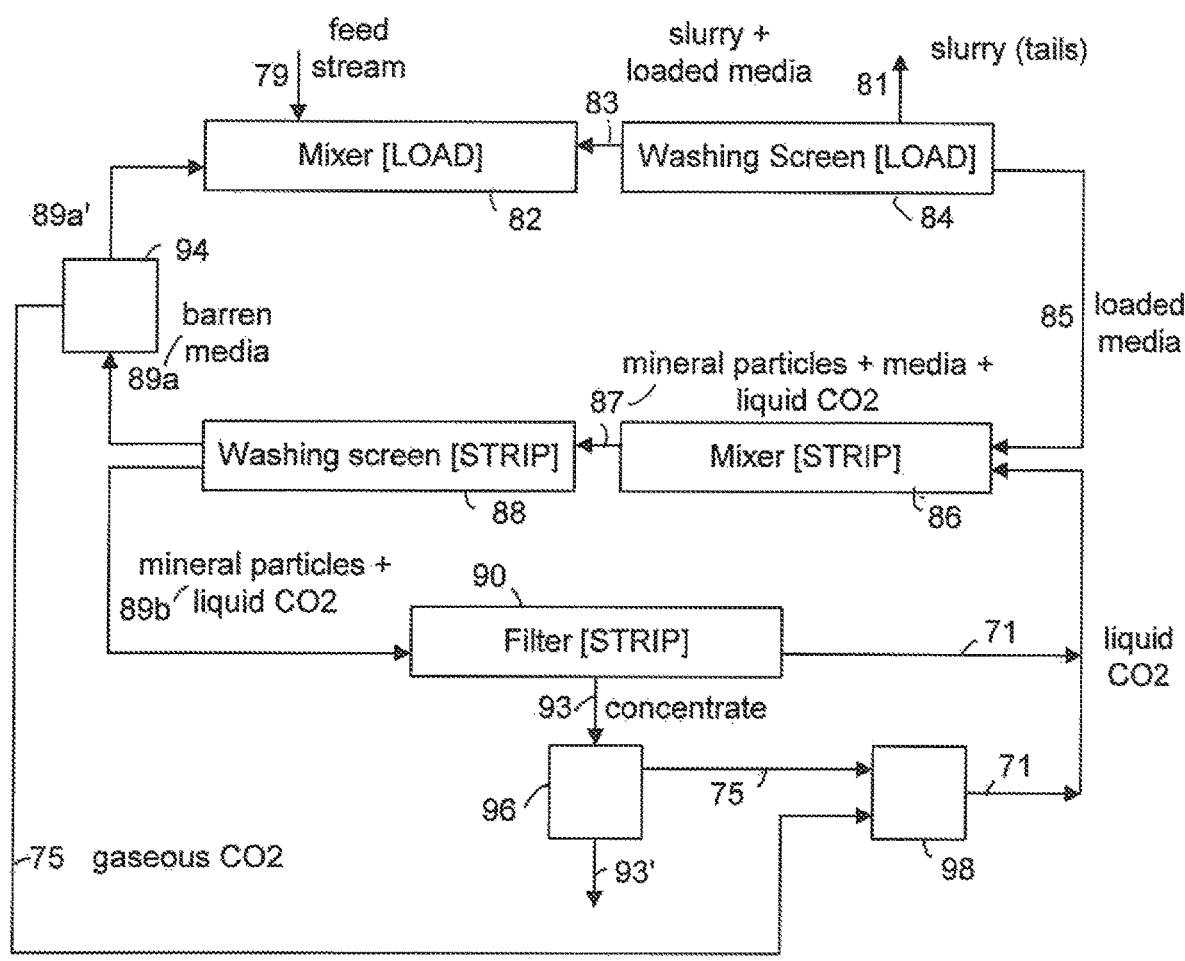
FIG. 2b illustrates an application of the selective recirculation circuit, according to another embodiment of the present invention.

In an embodiment of the present invention, the residual liquid CO2 in the barren media 89a and the residual liquid CO2 in the concentrates 93 can be removed by turning the liquid CO2 into gaseous CO2 in a phase changer 94 or 96. The gaseous CO2 75 can be re-condensed into liquid CO2 in a condenser 98 to be recycled back to the mixer 86 as shown in FIG. 2b. For example, in the phase changers 94 and 96, the pressure is reduced to change liquid CO2 into gaseous state.

FIG. 4 depicts a generalized processing module 100 according to an embodiment of the present invention. The process module 100 has no moving parts. The processing module 100 has three sections or compartments: a receiving compartment 102, a mixing/loading compartment 104 and a separation compartment 106. The separation section 106 has a separating barrier 108. The processing module 100 has a first end and an opposing second end. The second end has two outputs 112 and 114. The first end has an input 110 and an optional input 109. The processing module 100 can be used as a mineral concentration device. In an embodiment of the present invention, the receiving compartment 102 is arranged to receive a slurry containing mineral particles and polymer-coated media having a hydrophobic surface to attract mineral particles. Both the slurry and the polymer-coated media can be received into the receiving compartment 102 through input 110. Alternatively, the slurry is received through the input 110 and the polymer-coated media (barren media) are received through the input 109. In the mixing/loading compartment 104, the slurry is caused to interact with the barren media so as to allow the mineral to attach to the hydrophobic surface of the polymer-coated media to provide loaded media. In the separation compartment 106, the loaded media are separated from the tails. After passing through the separating barrier 108, the loaded media are discharged through output 114 and the tails are discharged through output 112. It should be noted that, the slurry usually contains ground ore and water. The slurry also contains unwanted materials such as soil particles from the ore. It should also be noted that not all the mineral particles in the slurry will be attracted on and become attached to the polymer-coated media, and not all the polymer-coated media will become loaded media. Thus, although most of unwanted materials in the slurry will be discharged through output 112 as tails, the tails will contain some mineral particles that are not loaded onto the polymer-coated media. Likewise, the polymer-coated media discharged from output 114 are also likely containing "unloaded" media as well as loaded media.

The processing module 100 can be used to replace the loading mixer 82 and the loading washing screen 84 of the selective recirculation circuit as shown in FIG. 2a. The selective recirculation circuit which is modified by incorporating the processing module 100 is shown in FIG. 4a and FIG. 4b.

Figure 5B:
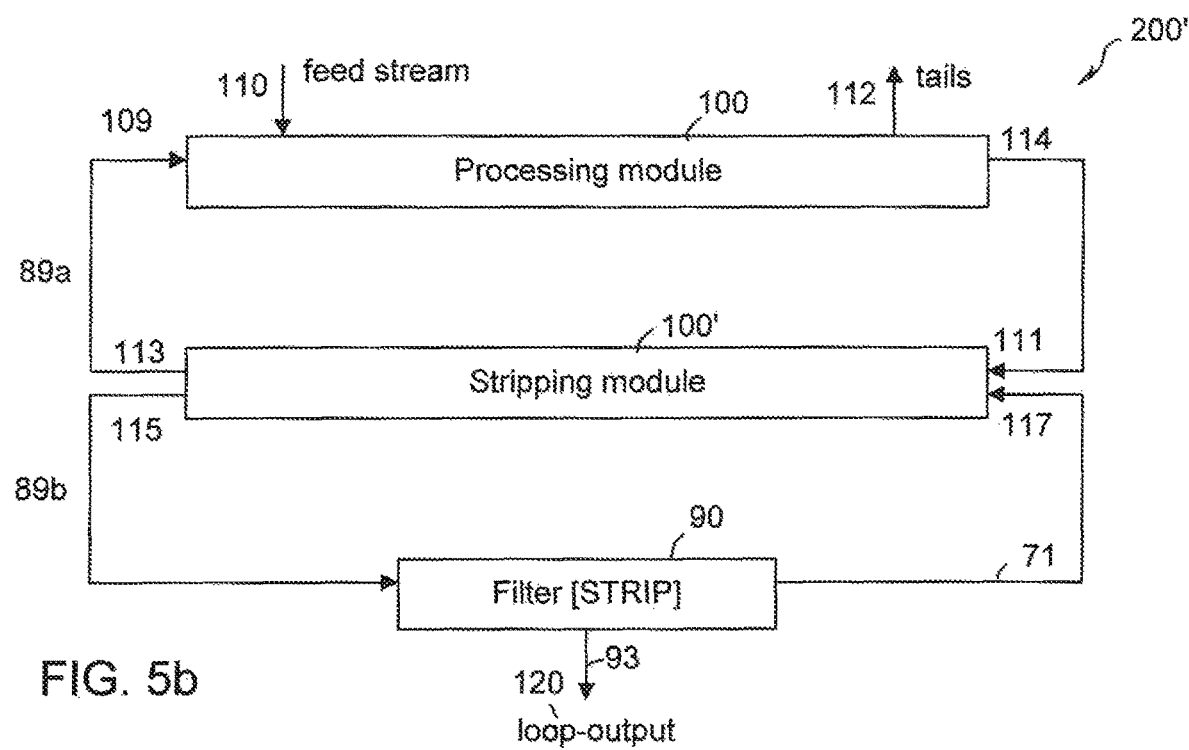
FIG. 5b illustrates a selective recirculation circuit modified to incorporate the processing module and the stripping module, according to a related invention.
Figure 5:
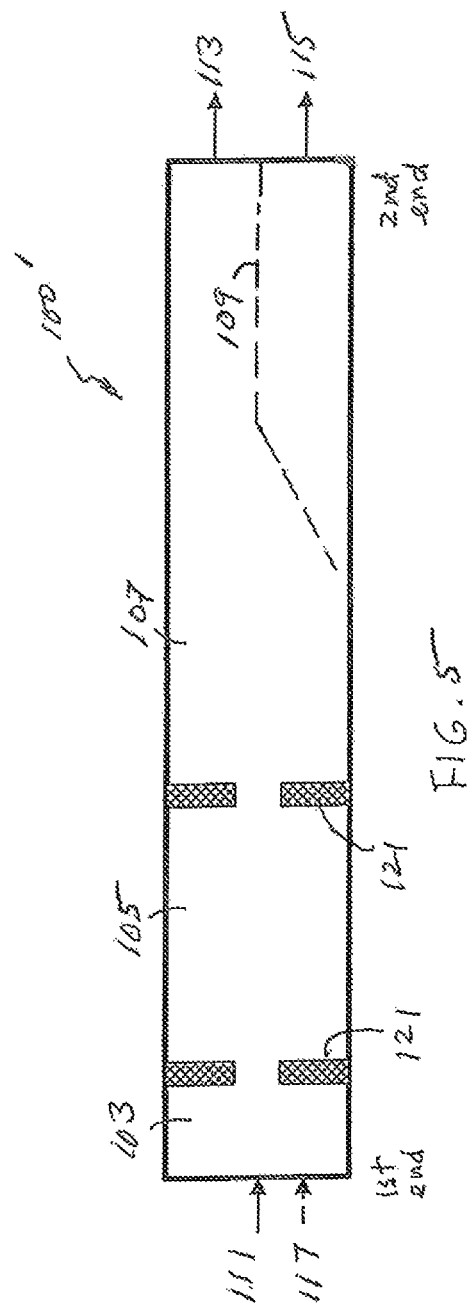
FIG. 5 illustrates a generalized stripping module, according to an embodiment of the present invention.

In an embodiment of the present invention, the stripping of the mineral particles from the loaded media can be carried out a stripping module 100' as shown in FIG. 5.

The stripping module 100' has three sections or compartments: a receiving compartment 103, an interaction compartment 105 and a separation compartment 107. The separation compartment 107 has a separating screen 109, for example. The stripping module 100' has a first end and an opposing second end. The second end has two outputs 113 and 115. The first end has a first input 111 and second input 117. For example, the input 111 can be used to received loaded media and the input 117 can be used to receive liquid CO2. The loaded media and the liquid CO2 are caused to interact with each other in the interaction compartment 105 so that the mineral particles attached to the loaded media can be stripped off by the liquid CO2. The stripping module 100' may have venturis or orifice plates 121 to disturb the liquid CO2 flow so as to enhance the stripping action of the liquid CO2 on the loaded media. The separating screen 109 is configured to separate the barren media from the mineral particles. The second end of the stripping module 100' has a first output 113 for discharging barren media and a second output 115 for discharging the mineral particles and liquid CO2. The separating screen 109 is used to guide the barren media toward the first output 113.

Figure 4A:
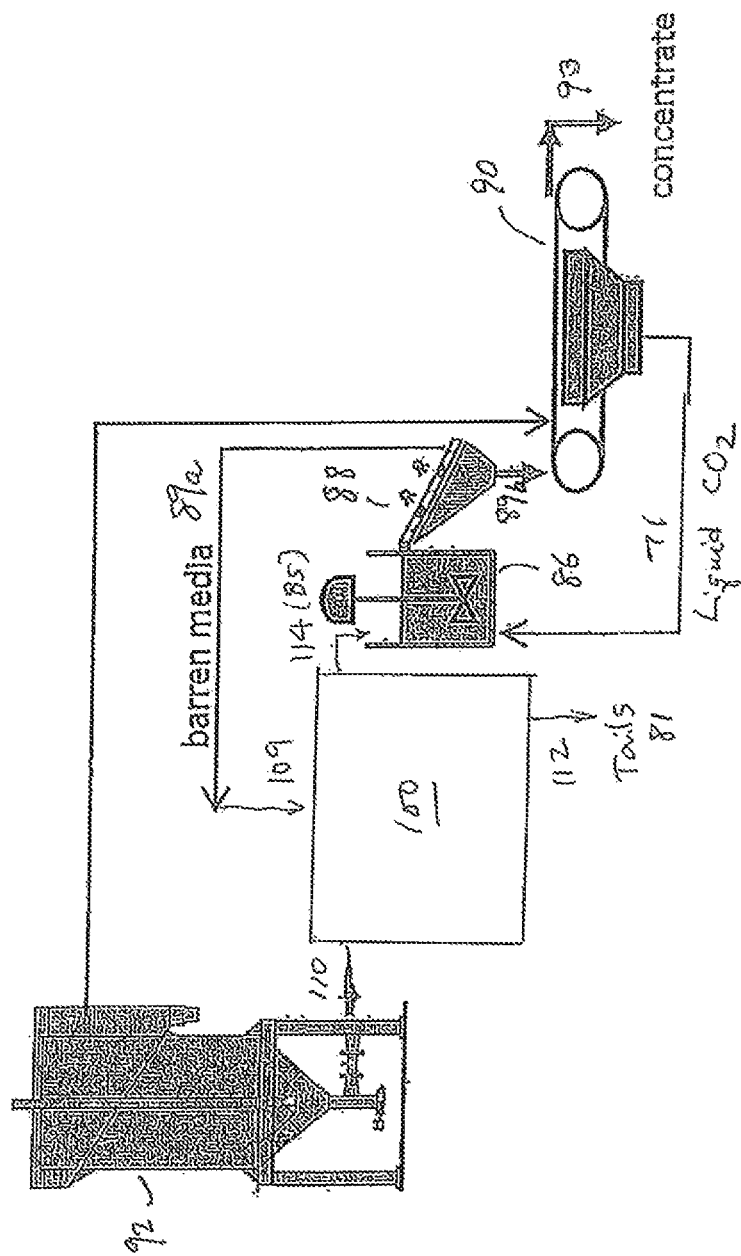
FIG. 4a illustrates an application of the selective recirculation circuit modified to incorporate the processing module, according to an embodiment of the present invention.
Figure 4B:
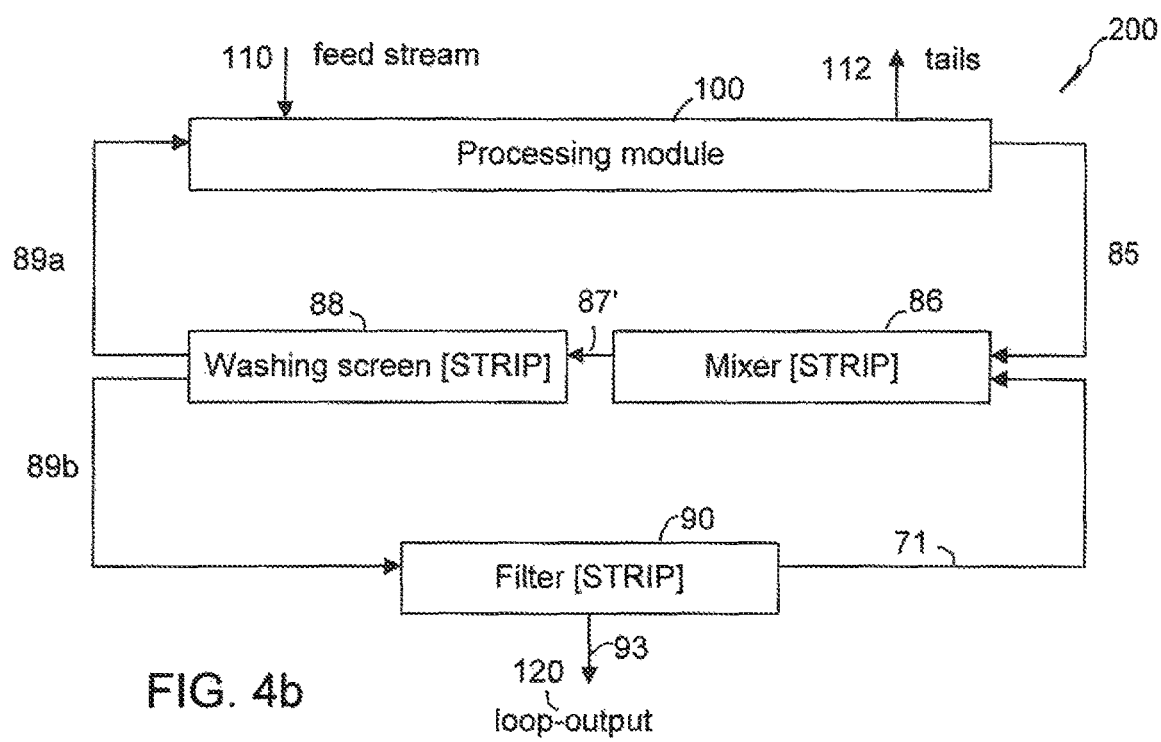
FIG. 4b illustrates a selective recirculation circuit modified to incorporate the processing module, according to an embodiment of the present invention.
Figure 5A:
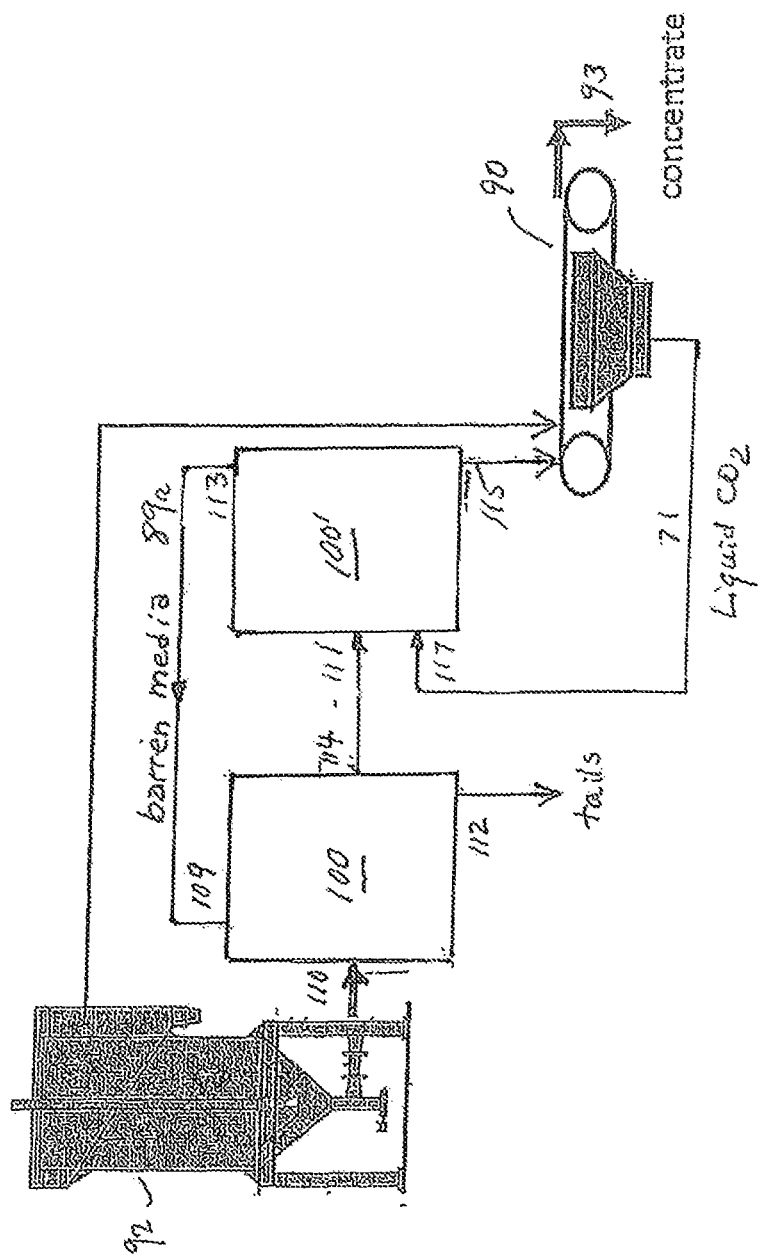
FIG. 5a illustrates an application of the selective recirculation circuit modified to incorporate the processing module and the stripping module, according to an embodiment of the present invention.

The stripping module 100' can be used to replace the mixer 86 and the screen 88 in the selective recirculation circuit as shown in FIG. 4b and the apparatus as shown in FIG. 4a. The modified apparatus is shown in FIG. 5a and the modified selective recirculation circuit is shown in FIG. 5b.

Figure 6A:
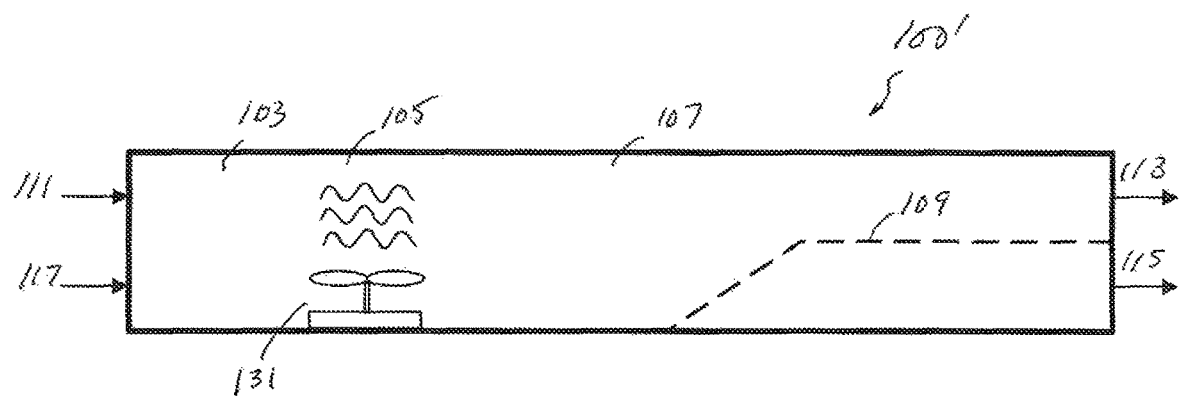
FIG. 6a illustrates a stripping module, according to an embodiment of the present invention.
Figure 6B:
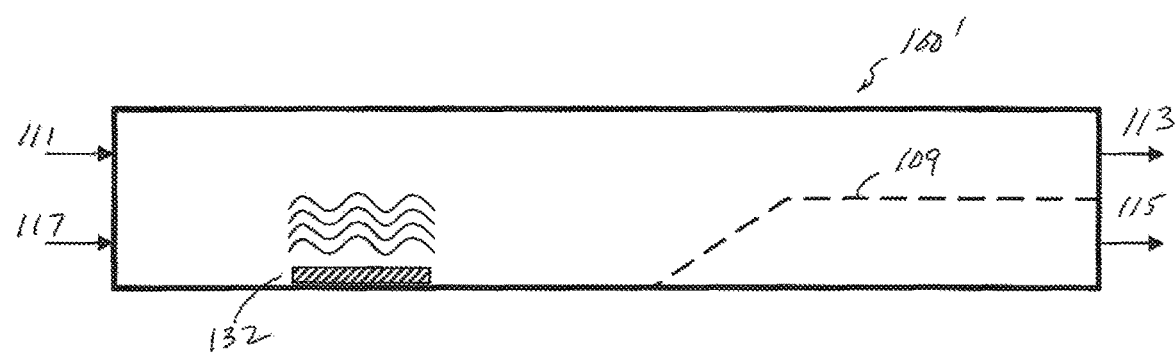
FIG. 6b illustrates a stripping module, according to an embodiment of the present invention.

The interaction between the loaded media and the liquid CO2 can be enhanced by various ways. According to an embodiment of the present invention, a mechanical stirrer 131 is used to disturb the flow of the liquid CO2 so as to facilitate the stripping of the mineral particles from the loaded media as shown in FIG. 6a. According to an embodiment of the present invention, a sonic source 132 can be used to agitate the liquid CO2 in the ultrasonic frequencies, for example. The ultrasonic waves are used to facilitate the stripping of the mineral particles from the loaded media as shown in FIG. 6b.

Figure 6C:
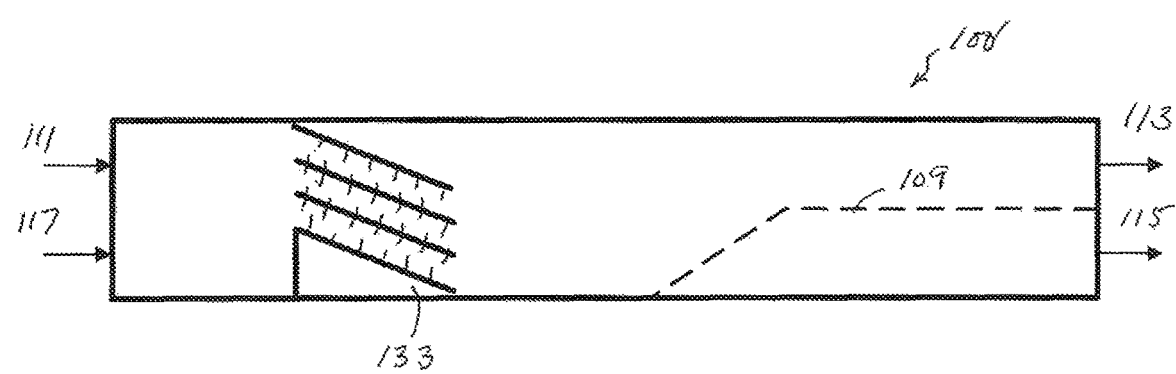
FIG. 6c illustrates a stripping module, according to an embodiment of the present invention.

According to an embodiment of the present invention, brush-like structures 133 are used to provide mechanical rubbing on the loaded media so as to facilitate the stripping of the mineral particles from the loaded media as shown in FIG. 6c.

Figure 6D:
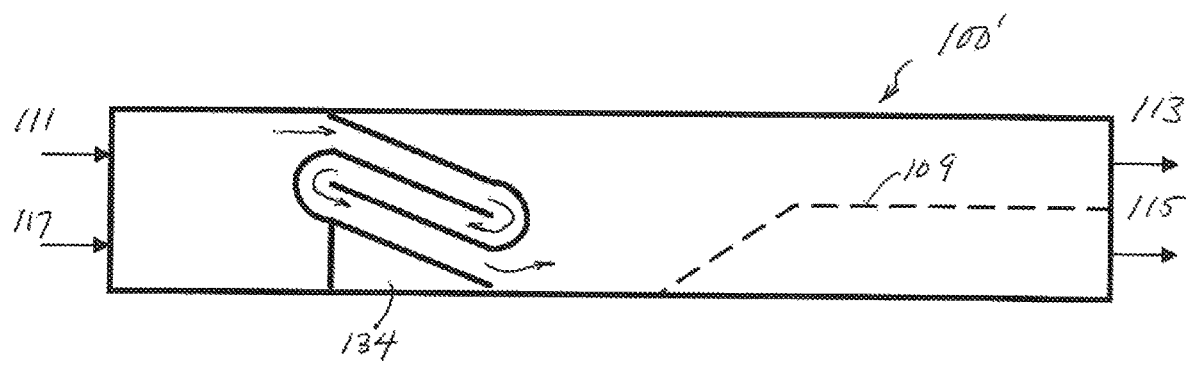
FIG. 6d illustrates a stripping module, according to an embodiment of the present invention.
Figure 6E:
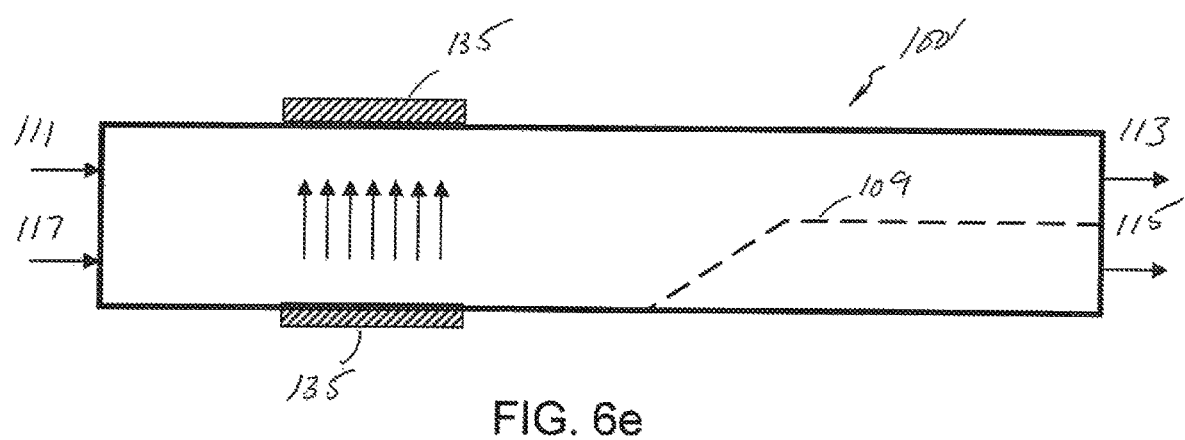
FIG. 6e illustrates a stripping module, according to an embodiment of the present invention.

According to an embodiment of the present invention, a path folding structure 134 is used to extend the flow path of the liquid CO2 so as to facilitate the stripping of the mineral particles from the loaded media as shown in FIG. 6d.

According to an embodiment of the present invention, a magnetic field generator 134 is to disturb the flow of the liquid CO2 when the loaded media are magnetically responsive as shown in FIG. 6d.

Figure 7:
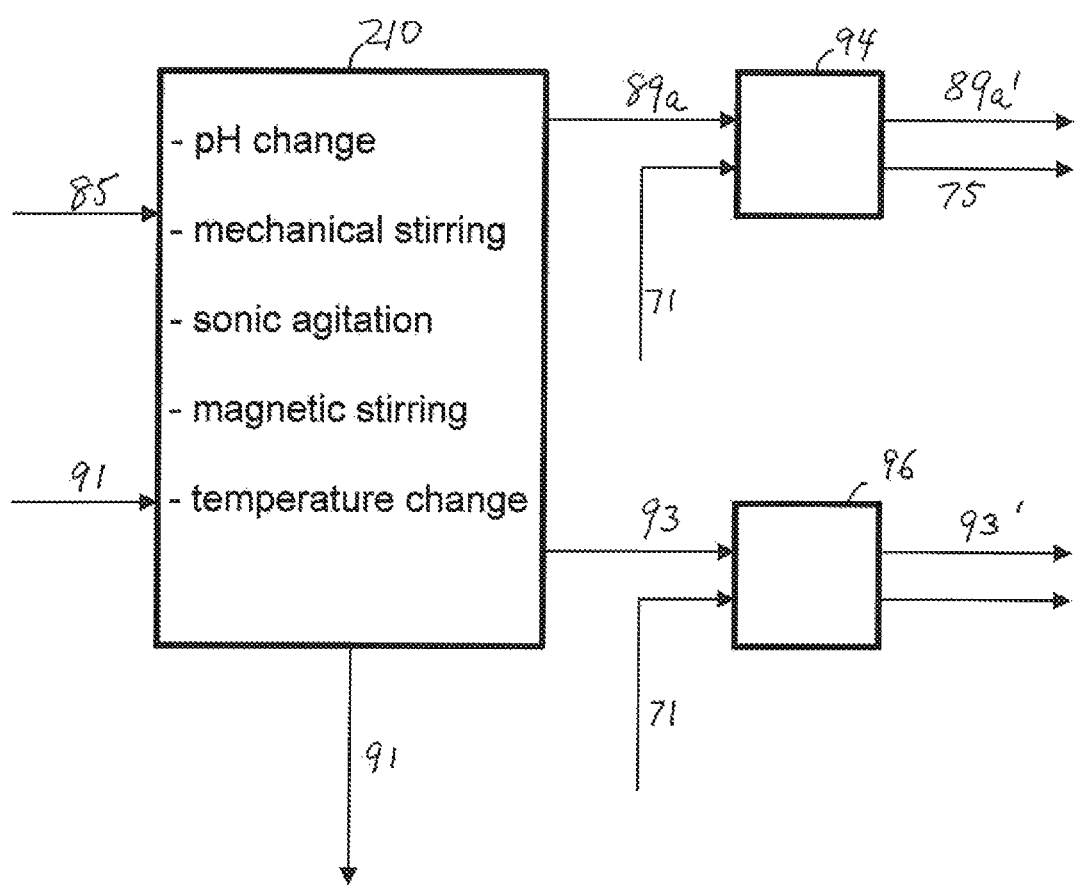
FIG. 7 illustrates a multi-stage mineral processing, according to an embodiment of the present invention.

According to an embodiment of the present invention, the stripping of the mineral particles from the loaded media can be carried out using conventional stripping agent such as water and/or surfactant. Subsequently, liquid CO2 is used to remove the residual stripping agent from the barren media and from the mineral concentrates. As shown in FIG. 7, loaded media are processed in a releasing apparatus 210 where a stripping agent such as water and/or surfactant is used to strip the mineral particles from the loaded media. Various releasing devices and/or conditions can be used to enhance the stripping of the mineral particles from the loaded media in the releasing apparatus 210. For example, the stripping agent in the releasing apparatus can have a high PH value and/or a high temperature. Mechanical stirring, sonic agitation or the like can also be used to enhance the stripping in the releasing apparatus 210. By way of example, various releasing methods are disclosed in commonly owned, PCT application no. PCT/US12/39591, entitled "Method and system for releasing mineral from synthetic bubbles and beads", filed 25 May 2012, which is hereby incorporated by reference in its entirety.

The term "polymer" in this specification means a large molecule made of many units of the same or similar structure linked together. The unit can be a monomer or an oligomer which forms the basis of, for example, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, polydimethylsiloxane and other organic or inorganic polymers. The list is not necessarily exhaustive. Thus, the synthetic material can be hard or rigid like plastic or soft and flexible like an elastomer. While the physical properties of the synthetic beads can vary, the surface of the synthetic beads is chemically functionalized to provide a plurality of functional groups to attract or attach to mineral particles. (By way of example, the term "functional group" may be understood to be a group of atoms responsible for the characteristic reactions of a particular compound, including those define the structure of a family of compounds and determine its properties.)

Figure 8B:
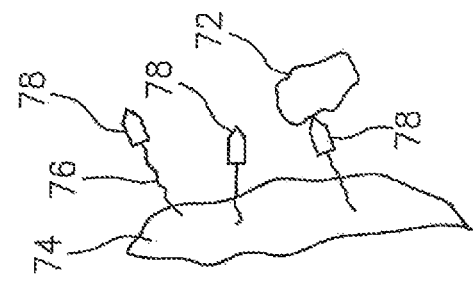
FIG. 8b illustrates an enlarged portion of the synthetic bead showing a molecule or molecular segment for attaching a function group to the surface of the synthetic bead, according to some embodiments of the present invention.
Figure 8A:
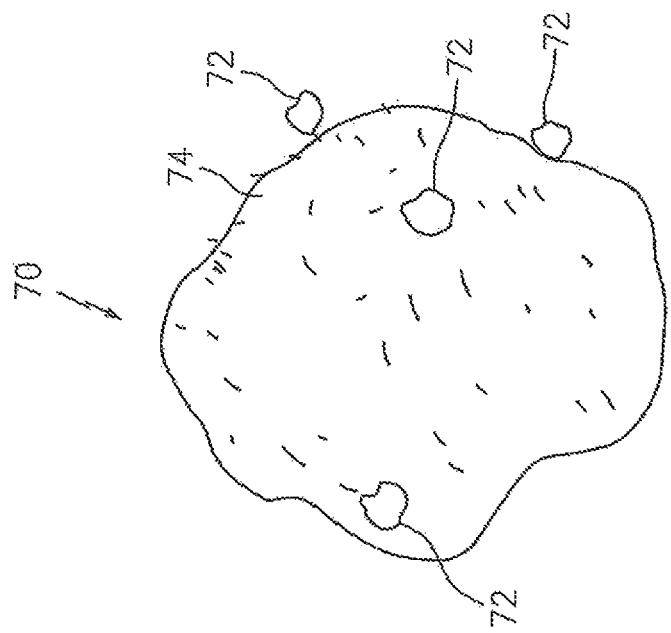
FIG. 8a shows a generalized synthetic bead which can be a size-based bead, weight-based polymer bead, and magnetic-based bead, according to some embodiments of the present invention.

For aiding a person of ordinary skill in the art in understanding various embodiments of the present invention, FIG. 8a shows a generalized synthetic bead and FIG. 8b shows an enlarged portion of the bead surface. The synthetic bead can be a size-based bead, weight-based polymer bead, and/or magnetic-based bead. As shown in FIGS. 8a and 8b, the synthetic bead 70 has a bead body to provide a bead surface 74. At least the outside part of the bead body is made of a synthetic material, such as polymer, so as to provide a plurality of molecules or molecular segments 76 on the surface 74. The molecule 76 is used to attach a chemical functional group 78 to the surface 74. In general, the molecule 76 can be a hydrocarbon chain, for example, and the functional group 78 can have an anionic bond for attracting or attaching a mineral, such as copper to the surface 74. A xanthate, for example, has both the functional group 78 and the molecular segment 76 to be incorporated into the polymer that is used to make the synthetic bead 70. A functional group 78 is also known as a collector that is either ionic or non-ionic. The ion can be anionic or cationic. An anion includes oxyhydryl, such as carboxylic, sulfates and sulfonates, and sulfhydral, such as xanthates and dithiophosphates. Other molecules or compounds that can be used to provide the function group 78 include, but are not limited to, thionocarboamates, thioureas, xanthogens, monothiophosphates, hydroquinones and polyamines. Similarly, a chelating agent can be incorporated into or onto the polymer as a collector site for attracting a mineral, such as copper. As shown in FIG. 3b, a mineral particle 72 is attached to the functional group 78 on a molecule 76. In general, the mineral particle 72 is much smaller than the synthetic bead 70. Many mineral particles 72 can be attracted to or attached to the surface 74 of a synthetic bead 70.

Figure 9C:
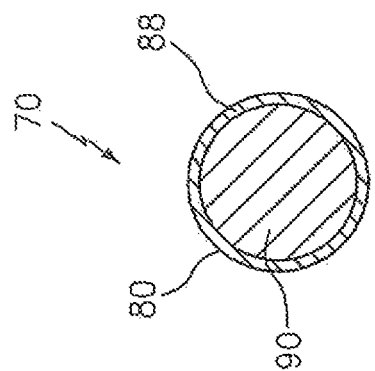
FIG. 9c illustrates a synthetic bead with a synthetic coating, according to some embodiments of the present invention.

In some embodiments of the present invention, a synthetic bead has a solid-phase body made of a synthetic material, such as polymer. The polymer can be rigid or elastomeric. An elastomeric polymer can be polyisoprene or polybutadiene, for example. The synthetic bead 70 has a bead body 80 having a surface comprising a plurality of molecules with one or more functional groups for attracting mineral particles to the surface. A polymer having a functional group to collect mineral particles is referred to as a functionalized polymer. In one embodiment, the entire interior part 82 of the synthetic bead 80 is made of the same functionalized material, as shown in FIG. 9*a*. In another embodiment, the bead body 80 includes a shell 84. The shell 84 can be formed by way of expansion, such as thermal expansion or pressure reduction. The shell 84 can be a micro-bubble or a balloon. In FIG. 9*b*, the shell 84, which is made of functionalized material, has an interior part 86. The interior part 86 can be filled with air or gas to aid buoyancy, for example. The interior part 86 can be used to contain a liquid to be released during the mineral separation process. The encapsulated liquid can be a polar liquid or a non-polar liquid, for example. The encapsulated liquid can contain a depressant composition for the enhanced separation of copper, nickel, zinc, lead in sulfide ores in the flotation stage, for example. The shell 84 can be used to encapsulate a powder which can have a magnetic property so as to cause the synthetic bead to be magnetic, for example. The encapsulated liquid or powder may contain monomers, oligomers or short polymer segments for wetting the surface of mineral particles when released from the beads. For example, each of the monomers or oligomers may contain one functional group for attaching to a mineral particle and an ion for attaching the wetted mineral particle to the synthetic bead. The shell 84 can be used to encapsulate a solid core, such as Styrofoam to aid buoyancy, for example. In yet another embodiment, only the coating of the bead body is made of functionalized polymer. As shown in FIG. 9*c*, the synthetic bead has a core 90 made of ceramic, glass or metal and only the surface of core 90 has a coating 88 made of functionalized polymer. The core 90 can be a hollow core or a filled core depending on the application. The core 90 can be a micro-bubble, a sphere or balloon. For example, a filled core made of metal makes the density of the synthetic bead to be higher than the density of the pulp slurry, for example. The core 90 can be made of a magnetic material so that the para-, ferri-, ferro-magnetism of the synthetic bead is greater than the para-, ferri-, ferro-magnetism of the unwanted ground ore particle in the mixture. In a different embodiment, the synthetic bead can be configured with a ferro-magnetic or ferri-magnetic core that attracts to paramagnetic surfaces. A core 90 made of glass or ceramic can be used to make the density of the synthetic bead substantially equal to the density of the pulp slurry so that when the synthetic beads are mixed into the pulp slurry for mineral collection, the beads can be in a suspension state.

Figure 9D:
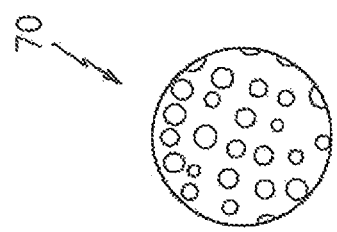
FIG. 9d illustrates a synthetic bead taking the form of a porous block, a sponge or a foam, according to some embodiments of the present invention.
Figure 9B:
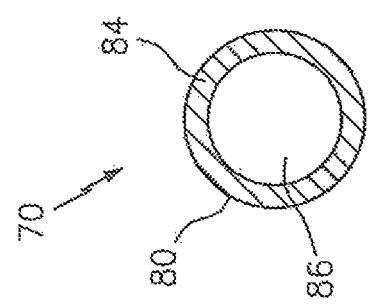
FIG. 9b illustrates a synthetic bead with a synthetic shell, according to some embodiments of the present invention.
Figure 9A:
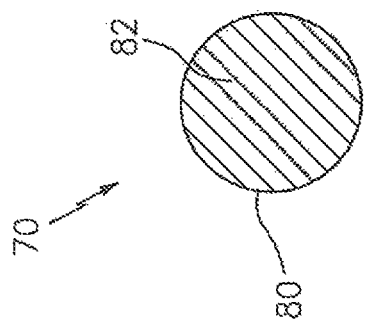
FIG. 9a illustrates a synthetic bead having a body made of a synthetic material, according to some embodiments of the present invention.

According to a different embodiment of the present invention, the synthetic bead 70 can be a porous block or take the form of a sponge or foam with multiple segregated gas filled chambers as illustrated in FIG. 9*d*. The combination of air and the synthetic beads 70 can be added to traditional naturally aspirated flotation cell.

It should be understood that the term "bead" does not limit the shape of the synthetic bead of the present invention to be spherical, as shown in FIGS. 9*a*-9*d*. In some embodiments of the present invention, the synthetic bead 70 can have an elliptical shape, a cylindrical shape, a shape of a rectangular block. Furthermore, the synthetic bead can have an irregular shape.

It should also be understood that the surface of a synthetic bead, according to the present invention, is not limited to an overall smooth surface as shown in FIG. 9*a*. In some embodiments of the present invention, the surface can be irregular and rough. For example, the surface 74 can have some physical structures 92 like grooves or rods as shown in FIG. 10*a*. The surface 74 can have some physical structures 94 like holes or dents as shown in FIG. 10*b*. The surface 74 can have some physical structures 96 formed from stacked beads as shown in FIG. 10*c*. The surface 74 can have some hair-like physical structures 98 as shown in FIG. 10*d*. In addition to the functional groups on the synthetic beads that attract mineral particles to the bead surface, the physical structures can help trapping the mineral particles on the bead surface. The surface 74 can be configured to be a honeycomb surface or sponge-like surface for trapping the mineral particles and/or increasing the contacting surface.

It should also be noted that the synthetic beads of the present invention can be realized by a different way to achieve the same goal. Namely, it is possible to use a different means to attract the mineral particles to the surface of the synthetic beads. For example, the surface of the polymer beads, shells can be functionalized with a hydrophobic chemical molecule or compound. Alternatively, the surface of beads made of glass, ceramic and metal can be coated with hydrophobic chemical molecules or compounds. Using the coating of glass beads as an example, polysiloxanates can be used to functionalize the glass beads in order to make the synthetic beads. In the pulp slurry, xanthate and hydroxamate collectors can also be added therein for collecting the mineral particles and making the mineral particles hydrophobic. When the synthetic beads are used to collect the mineral particles in the pulp slurry having a pH value around 8-9, it is possible to release the mineral particles on the enriched synthetic beads from the surface of the synthetic beads in an acidic solution, such as a sulfuric acid solution. It is also possible to release the mineral particles carrying with the enriched synthetic beads by sonic agitation, such as ultrasonic waves.

The multiplicity of hollow objects, bodies, elements or structures may include hollow cylinders or spheres, as well as capillary tubes, or some combination thereof. The scope of the invention is not intended to be limited to the type, kind or geometric shape of the hollow object, body, element or structure or the uniformity of the mixture of the same. Each hollow object, body, element or structure may be configured with a dimension so as not to absorb liquid, including water, including where the dimension is in a range of about 20-30 microns. Each hollow object, body, element or structure may be made of glass or a glass-like material, as well as some other suitable material either now known or later developed in the future.

By way of example, the multiplicity of hollow objects, bodies, elements or structures that are received in the mixture may include a number in a range of multiple thousands of beads per cubic foot of mixture, although the scope of the invention is not intended to be limited per se to the specific number of beads. For instance, a mixture of about three thousand cubic feet may include multiple millions of beads, e.g., having a size of about 1 millimeter, in three thousand cubic feet of the mixture.

The multiplicity of hollow objects, bodies, elements or structures may be configured with chemicals applied to prevent migration of liquid into respective cavities, unfilled spaces or holes before the wet concrete mixture cures, including where the chemicals are hydrophobic chemicals.

The one or more beads may take the form of a small quantity of gas, including air, that is trapped or maintained in the cavities, unfilled spaces, or holes of the multiplicity of hollow objects, bodies, elements or structures.

The scope of the invention is intended to include the synthetic beads shown herein being made from a polymer or polymer-based material, or a silica or silica-based, or a glass or glass-based material.

According to some embodiments of the present invention, the engineered collection media take the form of an open-cell foam/structure in a rectangular block or a cubic shape 70a as illustrated in FIG. 11a. Depending upon the material that is used to make the collection media, the specific gravity of the collection media can be smaller than, equal to or greater than the slurry.

According to some embodiments of the present invention, the engineered collection media may take the form of a filter 70b with a three-dimensional open-cell structure as shown in FIG. 11b. The filter 70b can be used in a filtering assembly, for example.

According to some embodiments of the present invention, the engineered collection media may take the form of a membrane 70c, a section of which is shown in FIG. 11c. As seen in FIG. 11c, the membrane 70c can have an open-cell foam layer attached to a substrate or base. The substrate can be made from a material which is less porous than the open-cell foam layer. For example, the substrate can be a sheet of pliable polymer to enhance the durability of the membrane. The membrane 70c can be used as a conveyor belt, for example.

According to some embodiments of the present invention, the engineered collection media may take the form of a membrane 70d, a section of which is shown in FIG. 11d. As seen in FIG. 11d, the membrane 70d can have two open-cell foam layers attached to two sides of a substrate or base. The substrate can be made of a material which is less porous than the open-cell foam layer. The membrane 70d can also be used as a conveyor belt, for example.

In various embodiments of the present invention, the engineered collection media as shown in FIGS. 11a-11d may include, or take the form of, a solid-phase body configured with a three-dimensional open-cell structure to provide a plurality of collection surfaces; and a coating may be configured to provide on the collection surfaces a plurality of molecules comprising a functional group having a chemical bond for attracting one or more mineral particles in an aqueous mixture to the molecules, causing the mineral particles to attach to the collection surfaces.

In some embodiments of the present invention, the open-cell structure or foam may include a coating attached thereto to provide a plurality of molecules to attract mineral particles, the coating including a hydrophobic chemical selected from a group consisting of polysiloxanates, poly(dimethylsiloxane) and fluoroalkylsilane, or what are commonly known as pressure sensitive adhesives with low surface energy.

In some embodiments of the present invention, the solid phase body may be made from a material selected from polyurethane, polyester urethane, polyether urethane, reinforced urethanes, PVC coated PV, silicone, polychloroprene, polyisocyanurate, polystyrene, polyolefin, polyvinylchloride, epoxy, latex, fluoropolymer, polypropylene, phenolic, EPDM, and nitrile.

In some embodiments of the present invention, the solid phase body may include a coating or layer, e.g., that may be modified with tackifiers, plasticizers, crosslinking agents, chain transfer agents, chain extenders, adhesion promoters, aryl or alky copolymers, fluorinated copolymers, hexamethyldisilazane, silica or hydrophobic silica.

Applications

The scope of the invention is described in relation to mineral separation, including the separation of copper from ore.

By way of example, applications are envisioned to include rougher, scavenger, cleaner and rougher/scavenger separation cells in the production stream, replacing the traditional flotation machines.

Applications are envisioned to include the separation of copper and molybdenum sulfides as disclosed in commonly owned, PCT application No. PCT/US17/55072, filed 4 Oct. 2017, entitled "Separation of copper and molybdenum sulfides from pyrite using a sea water/desalinated water hybrid process", which claims benefit to U.S. provisional application No. 62/403,837 of the same title, filed 4 Oct. 2016, which are hereby incorporated by reference in their entirely; and in commonly owned, PCT application No. PCT/US18/2042/filed 1 Mar. 2018, entitled "Mineral processing plant", which claims the benefit of U.S. provisional application No. 62/465,231, filed 1 Mar. 2017, entitled "Conventional mineral processing plant", which are all incorporated by reference herein in their entirety.

However, the scope of the invention is intended to include other types or kinds of applications either now known or later developed in the future, including applications related to oilsands separation that includes separating bitumen from sand and water in the recovery of bitumen in an oilsands mining operation.

In summary, hydrophobic coating is highly effective in selectively attaching hydrophobic or hydrophobized minerals. However, detachment requires various chemical and mechanical treatments. These treatments are resource-intensive and can contaminate the system with unwanted chemicals. The current cleaner or stripping agent is an aqueous solution or dispersion of surfactant with or without organic solvent. While effective at removing the particles from the surface; this cleaner cannot be completely removed from porous media or from the high surface area particle concentrate. This leads to tremendous losses of expensive cleaning fluid and potential for contaminating related processes with unwanted chemicals. Liquid and supercritical carbon dioxide have low-zero surface tension and low density. They can effectively remove the particles of interest from the surface. The carbon dioxide is then allowed to return to its gas phase where it is thoroughly removed from the porous media and from the particle concentrate such that no cleaning fluid is retained. This gaseous carbon dioxide is then condensed and reused in a closed circuit; providing for essentially no loss in cleaning fluid. This process is extremely environmentally and economically favored over the use of aqueous and/or organic agents.

Although the present invention is described as utilizing a three-dimensional open cellular structure with a coating that is selected to provide a surface for collection of the particles, the present invention may be used with any surface with a coating selected for collection of the particles. For example, the coating may be on a synthetic bead, belt, mesh, or other surface, such that the coated surface comes in contact with the particles for collection of the particles, and the coated surface with the particles attached is thereafter immersed in the liquid or supercritical carbon dioxide for release and collection of the particles.

It should be further appreciated that any of the features, characteristics, alternatives or modifications described regarding a particular embodiment herein may also be applied, used, or incorporated with any other embodiment described herein. Although the invention has been described and illustrated with respect to exemplary embodiments thereof, the foregoing and various other additions and omissions may be made therein and thereto without departing from the scope of the present invention.

What is claimed is:

1. An apparatus, comprising:
   loaded media comprising one or more collection surfaces having mineral particles attached thereon;
   a releasing agent; and
   a mixing compartment configured to facilitate contacting between said one or more collection surfaces and the releasing agent so as to separate the mineral particles from said one or more collection surfaces, wherein the releasing agent is selected from the group consisting of liquid carbon dioxide, supercritical fluid carbon dioxide, and HFC, and wherein each of said one or more collection surfaces comprises a solid-phase body having a surface functionalized to be hydrophobic.

2. The apparatus according to claim 1, wherein the solid-phase body is made of a synthetic material.

3. The apparatus according to claim 1, wherein the solid-phase body comprises a three-dimensional open cellular structure.

4. The apparatus according to claim 1, wherein the solid-phase body comprises an open-cell foam coated with a compliant, tacky polymer of low surface energy.

5. The apparatus according to claim 1, wherein the solid-phase body comprises an open-cell foam made from a material selected from the group consisting of reticulated polyurethane, silicone, polychloroprene, polyisocyanurate, polystyrene, polyolefin, polyvinylchloride, epoxy, latex, fluoropolymer, phenolic, EPDM and nitrile.

6. The apparatus according to claim 1, wherein the surface comprises a coating made of polysiloxane derivative.

7. The apparatus according to claim 1, wherein the surface is modified with a material selected from the group consisting of tackifiers, plasticizers, crosslinking agents, chain transfer agents, chain extenders, adhesion promoters, aryl or alky copolymers, fluorinated copolymers, hexamethyldisilazane and hydrophobic silica.

8. The apparatus according to claim 1, wherein the surface comprises a coating made of a material selected from the group consisting of acrylics, butyl rubber, ethylene vinyl acetate, natural rubber, nitriles; styrene block copolymers with ethylene, propylene, and isoprene; polyurethanes, and polyvinyl ethers.

9. The apparatus according to claim 1, wherein the solid-phase body comprises an open-cell structure made of a material selected from the group consisting of hard plastics, ceramics, carbon fiber, and metals.

10. The apparatus according to claim 1, wherein the solid-phase body comprises a sheet, a sphere, a cube, a block, a filter or a conveyor belt.

11. The apparatus according to claim 3, wherein the three-dimensional open cellular structure comprises a cellular density ranging from 10 to 200 pores per inch.

12. The apparatus according to claim 1, the mixing compartment comprises a first end a second end, the first end comprising a first mixer input configured to receive the release agent and a second mixer input configured to receive the loaded media, the second end comprising a first mixer output configured to discharge a barren media as a result of the mineral particles having been stripped off of the loaded media and a second mixer output configured to discharge a mixture containing mineral particles and the releasing agent, the apparatus further comprising:
   a loading stage and a filtering stage, wherein
   the loading stage comprises a first input configured to receive a slurry having the mineral particles, a second input configured to receive the barren media, a first output configured to discharge a remaining part of the slurry and a second output to provide the loaded media to the mixing compartment, and
   the filtering stage is configured to receive the mixture containing the mineral particles and the releasing agent and to separate the mineral particles and the releasing agent in the mixture, wherein the filtering stage comprises a first stage output and a second stage output, the first stage output configured to return the separated releasing agent to the mixing compartment, the second stage output configured to discharge the separated mineral particles as a concentrate.

13. The apparatus according to claim 12, wherein the barren media discharged from the first mixer output and the concentrate discharged from the second stage output comprise a residual amount of the releasing agent, the apparatus further comprising a first phase-changer device and a second phase-changer device, the first phase-changer device configured to change the residual amount of the releasing agent into a gaseous agent, the second phase-changer device configured to change the gaseous agent into a recovered releasing agent.

14. A method, comprising
   receiving loaded media comprising one or more collection surfaces having mineral particles attached thereon;
   causing the loaded media to interact with a releasing agent so as to separate the mineral particles from said one or more collection surfaces, wherein the releasing agent is selected from the group consisting of liquid carbon dioxide, supercritical fluid carbon dioxide, and HFC, and wherein each of said one or more collection surfaces comprises a solid-phase body having a surface functionalized to be hydrophobic.

15. The method according to claim 14, wherein the solid-phase body comprises an open-cell foam coated with a compliant, tacky polymer of low surface energy.

16. The method according to claim 14, wherein the solid-phase body comprises an open-cell foam made from a material selected from the group consisting of reticulated polyurethane, silicone, polychloroprene, polyisocyanurate, polystyrene, polyolefin, polyvinylchloride, epoxy, latex, fluoropolymer, phenolic, EPDM and nitrile.

17. The method according to claim 14, wherein the surface is modified with a material selected from the group consisting of tackifiers, plasticizers, crosslinking agents, chain transfer agents, chain extenders, adhesion promoters, aryl or alky copolymers, fluorinated copolymers, hexamethyldisilazane and hydrophobic silica.

* * * * *